Dec. 7, 1954   W. C. SHAW ET AL   2,696,321
ASSEMBLING MACHINE
Filed Aug. 9, 1951   21 Sheets-Sheet 1

Willard C. Shaw
Wilbur C. Crim
INVENTORS

BY Willits, Hardman & Fehr
their attorney

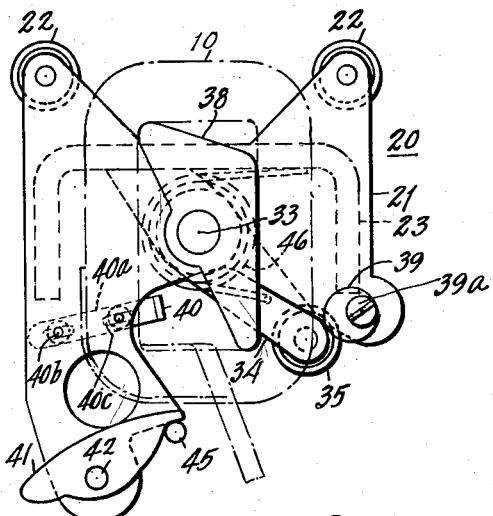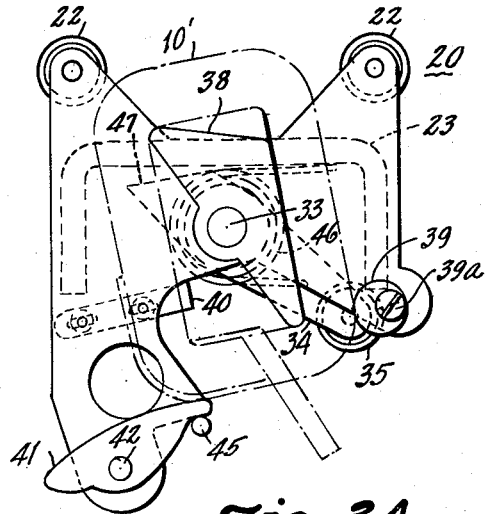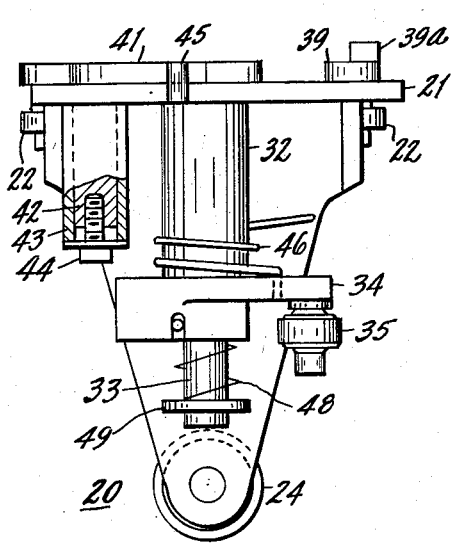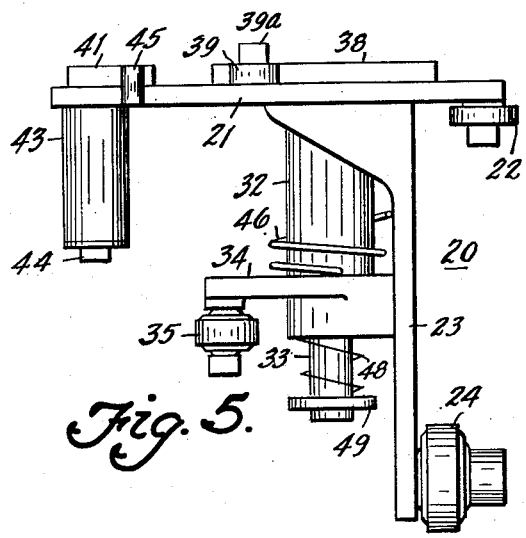

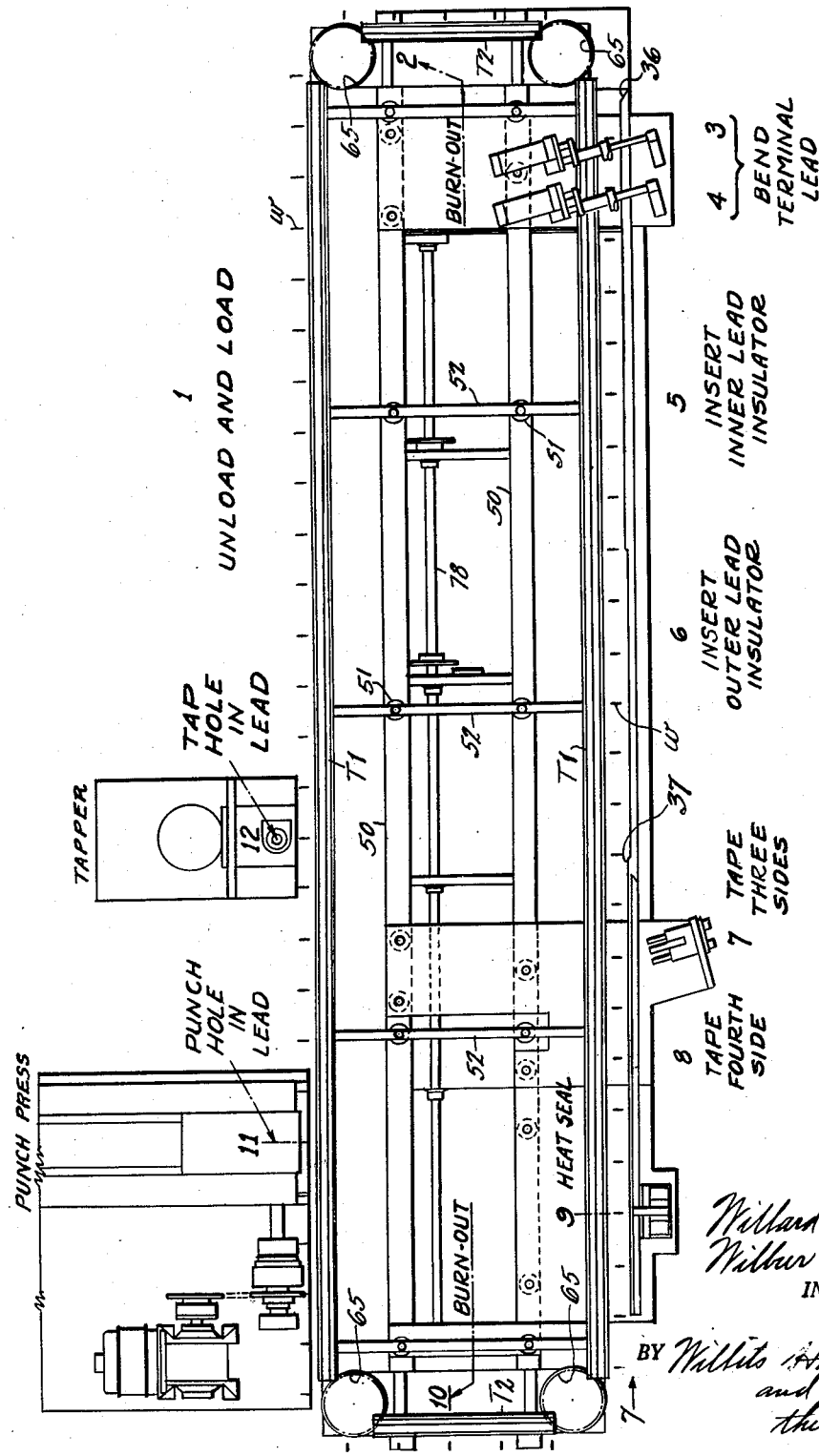

Dec. 7, 1954  W. C. SHAW ET AL  2,696,321
ASSEMBLING MACHINE
Filed Aug. 9, 1951  21 Sheets-Sheet 4

Willard C. Shaw
Walter C. Crim
INVENTORS

BY Willits Hardman
and Fehr
their attorneys

Dec. 7, 1954  W. C. SHAW ET AL  2,696,321
ASSEMBLING MACHINE
Filed Aug. 9, 1951  21 Sheets-Sheet 5
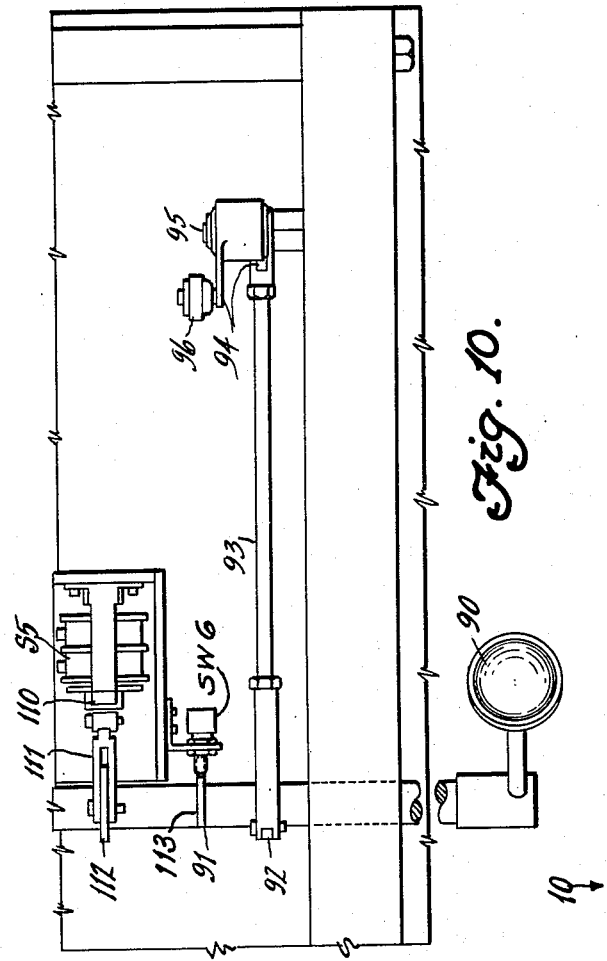
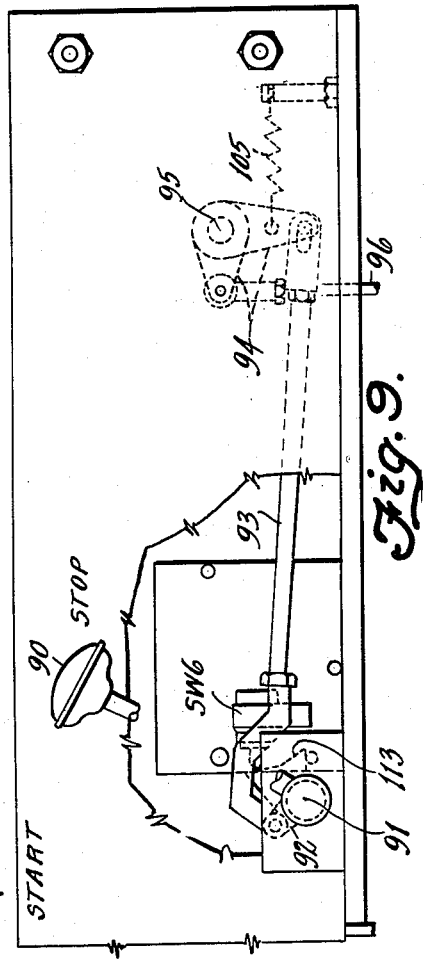
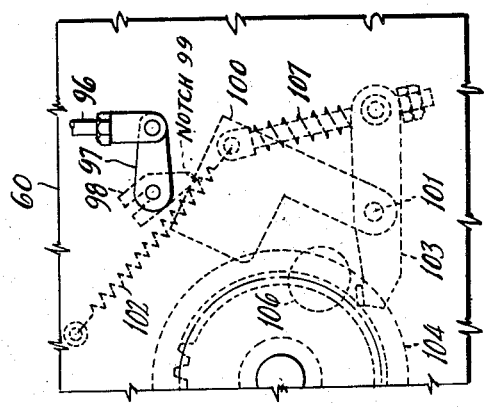
Willard C. Shaw
Wilbur C. Crum
INVENTORS
BY Willits Hardman
and Fehr
their attorneys Dec. 7, 1954   W. C. SHAW ET AL   2,696,321
ASSEMBLING MACHINE
Filed Aug. 9, 1951   21 Sheets-Sheet 6

Willard C. Shaw
Wilbur C. Crim
INVENTORS

BY Willits, Hardman
and Fehr
their attorneys

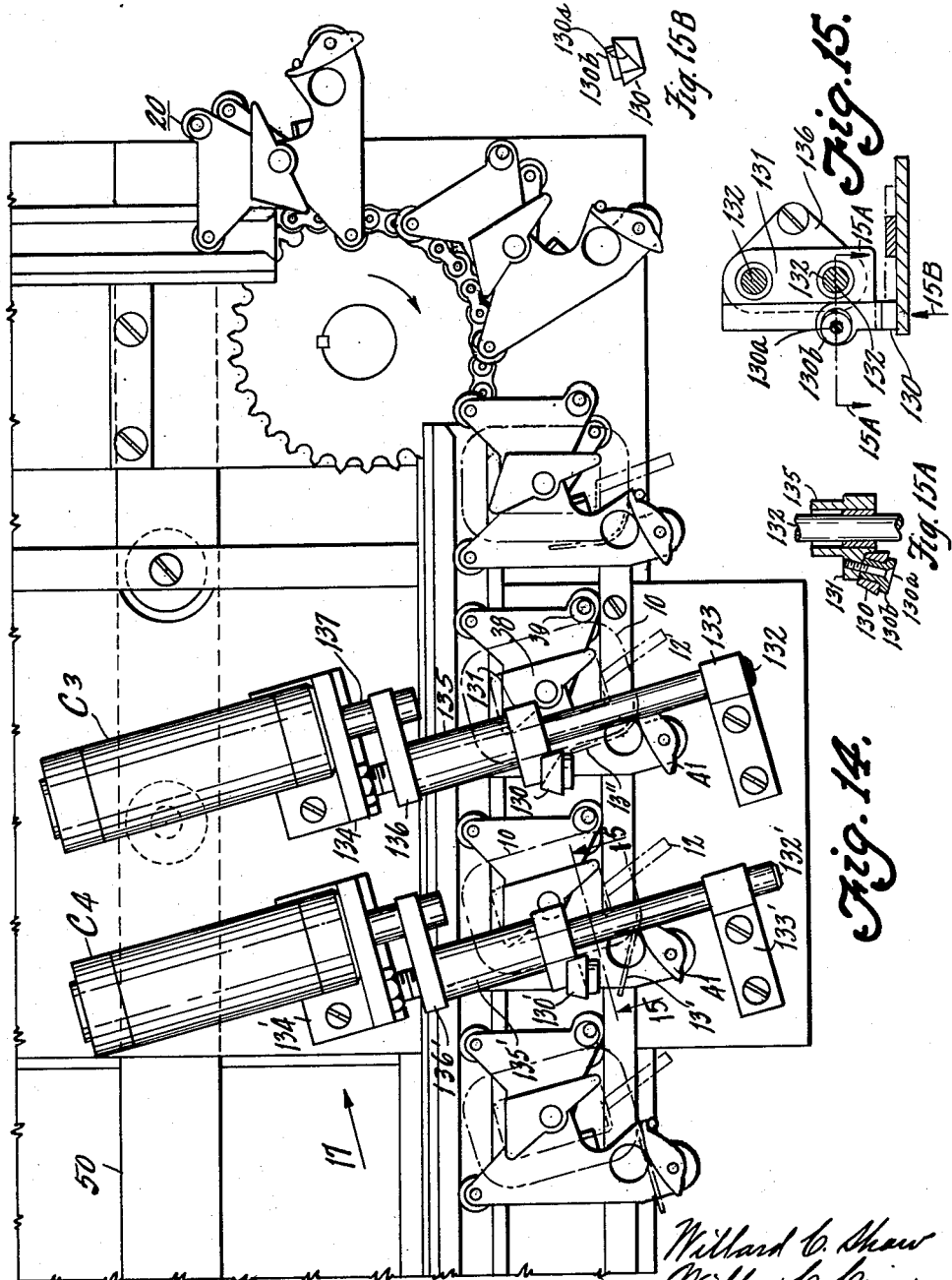

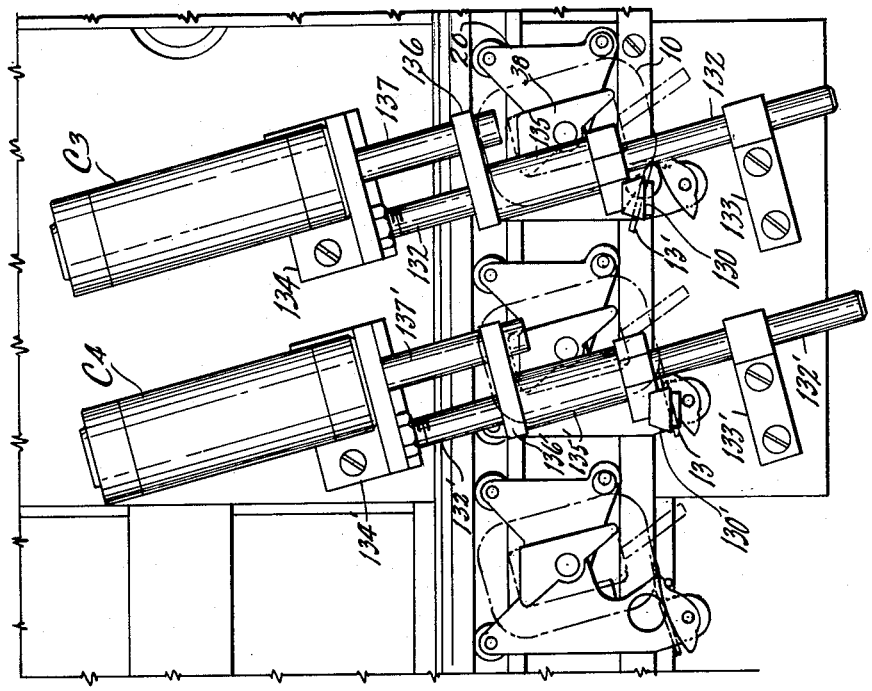
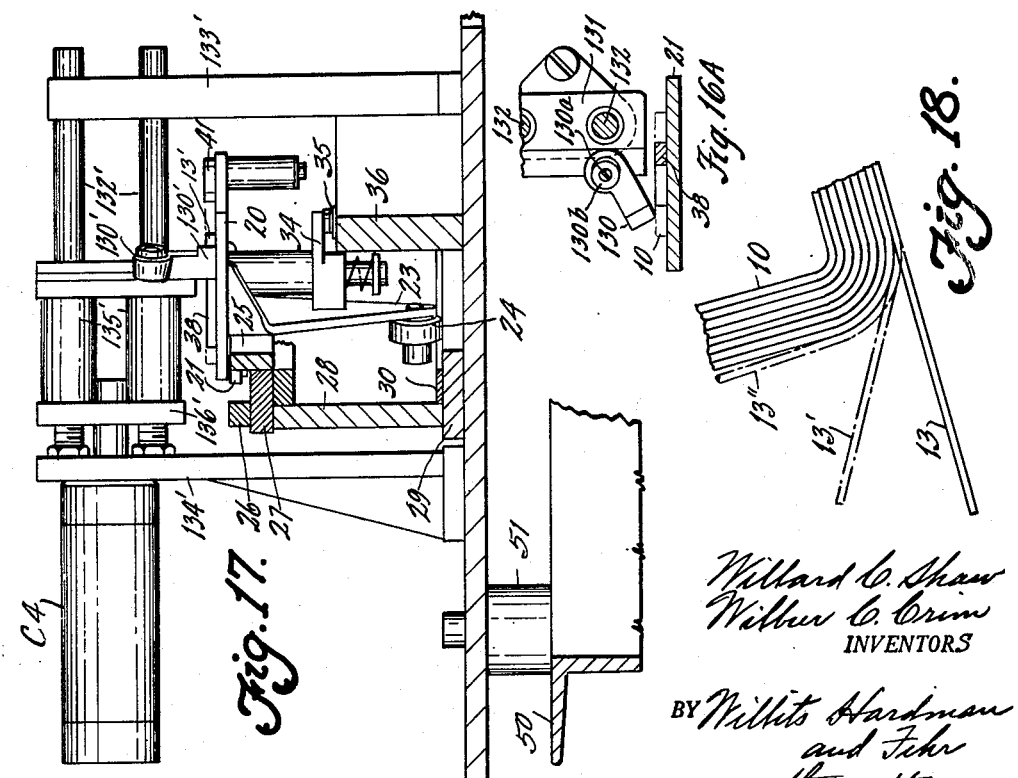

Dec. 7, 1954   W. C. SHAW ET AL   2,696,321
ASSEMBLING MACHINE
Filed Aug. 9, 1951   21 Sheets-Sheet 10
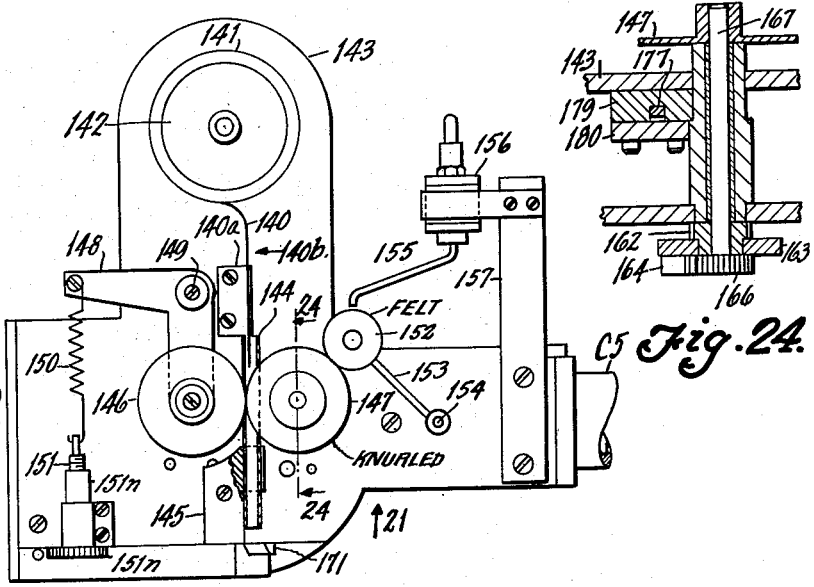
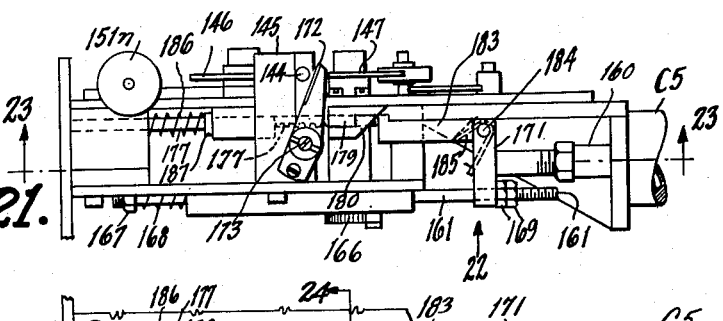
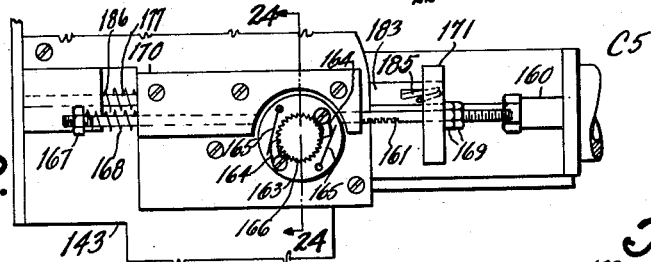
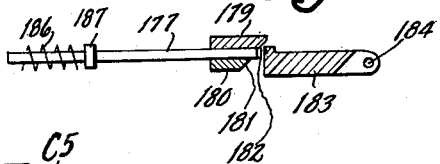
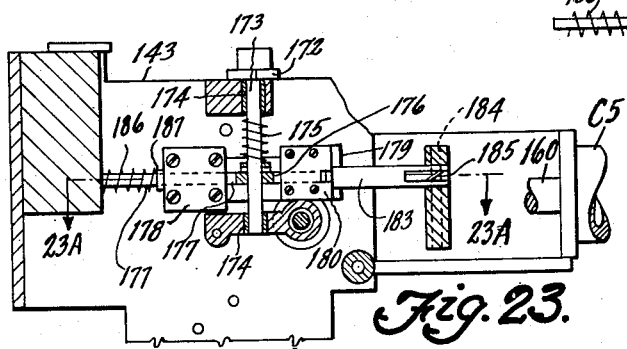

Dec. 7, 1954 W. C. SHAW ET AL 2,696,321
ASSEMBLING MACHINE
Filed Aug. 9, 1951 21 Sheets-Sheet 11

Willard C. Shaw
Wilbur C. Crim
INVENTORS

BY Willits, Hardman
and Fehr
their attorneys

Dec. 7, 1954  W. C. SHAW ET AL  2,696,321
ASSEMBLING MACHINE
Filed Aug. 9, 1951  21 Sheets-Sheet 12
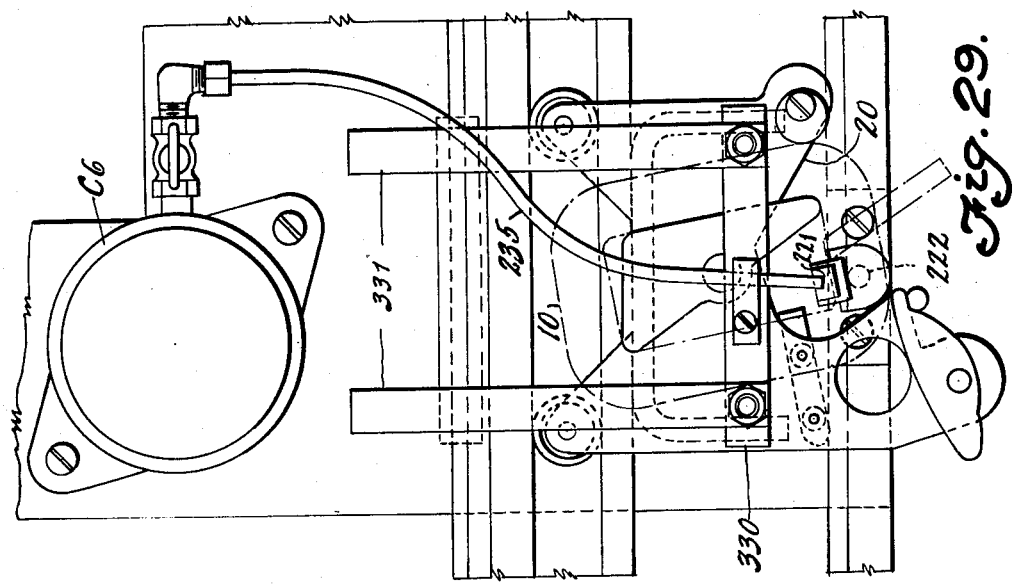
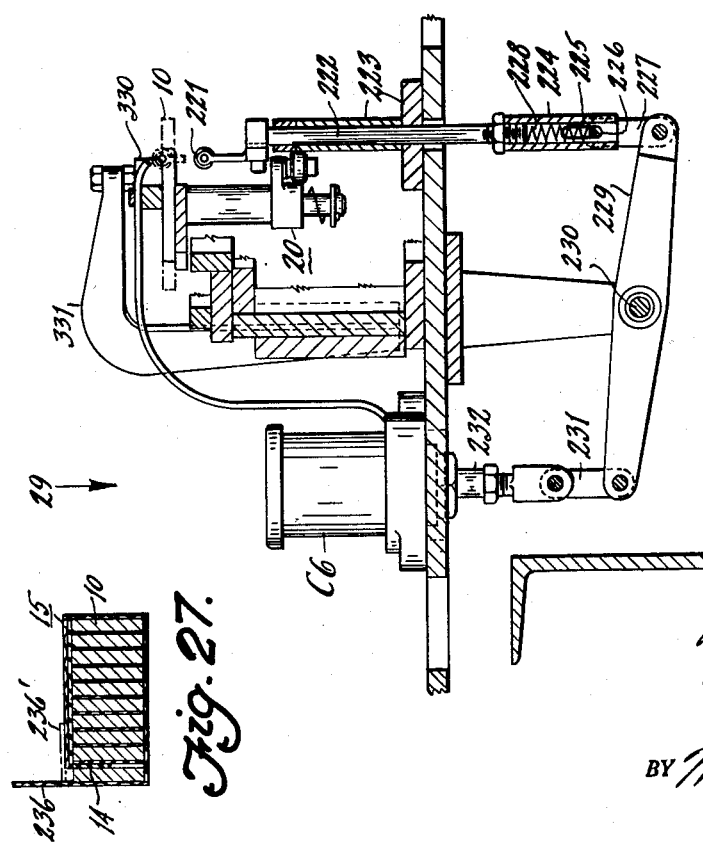
Willard C. Shaw
Wilbur C. Crim
INVENTORS
BY Willits Hardman
and Fehr
their attorneys

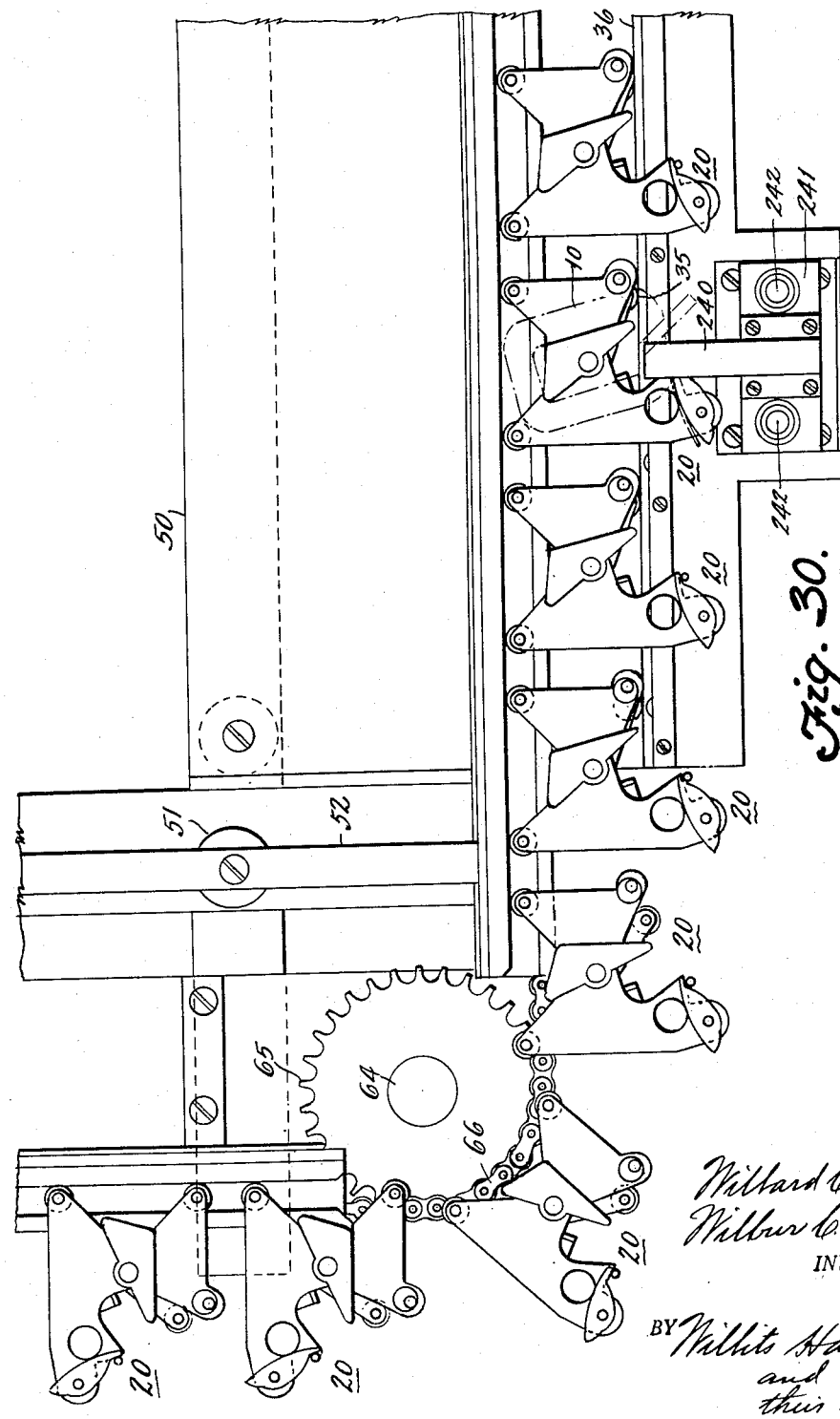

Dec. 7, 1954   W. C. SHAW ET AL   2,696,321
ASSEMBLING MACHINE
Filed Aug. 9, 1951   21 Sheets-Sheet 14

Willard C. Shaw
Wilbur C. Crim
INVENTORS

BY Homer Hardman
and Fehr
their attorneys

Dec. 7, 1954  W. C. SHAW ET AL  2,696,321
ASSEMBLING MACHINE
Filed Aug. 9, 1951  21 Sheets-Sheet 15
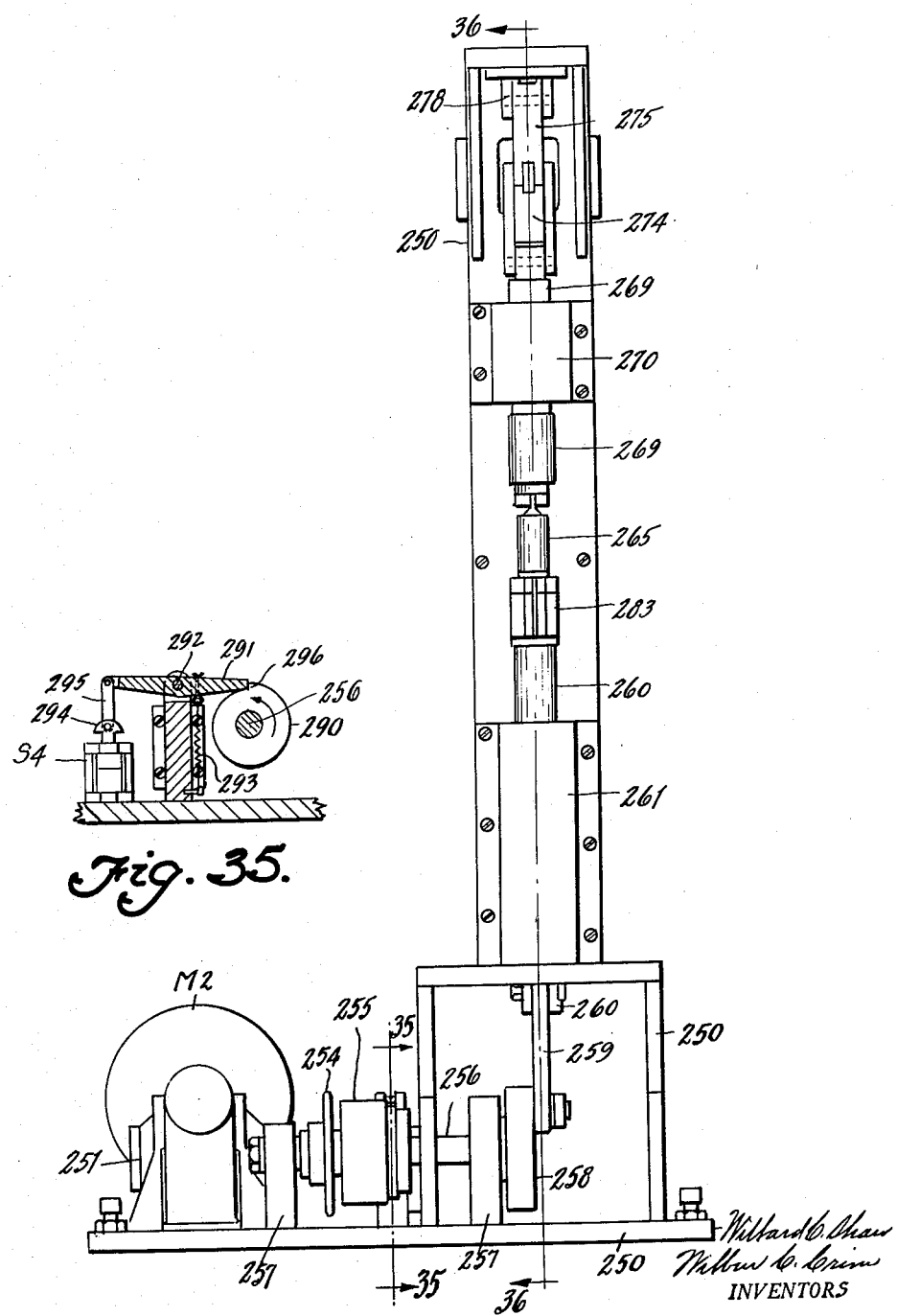

Dec. 7, 1954   W. C. SHAW ET AL   2,696,321
ASSEMBLING MACHINE
Filed Aug. 9, 1951   21 Sheets-Sheet 16
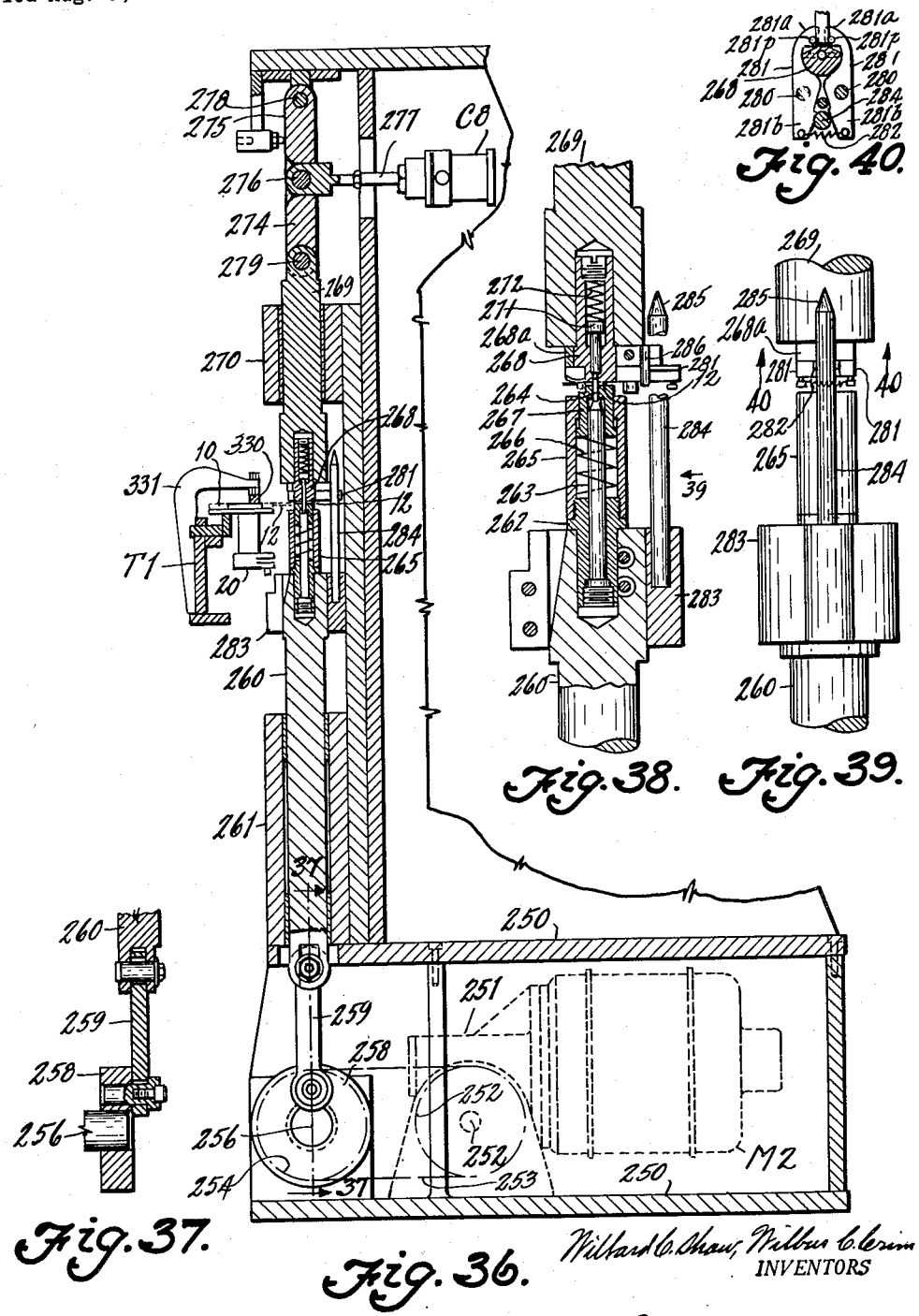

Dec. 7, 1954 W. C. SHAW ET AL 2,696,321
ASSEMBLING MACHINE
Filed Aug. 9, 1951 21 Sheets-Sheet 17
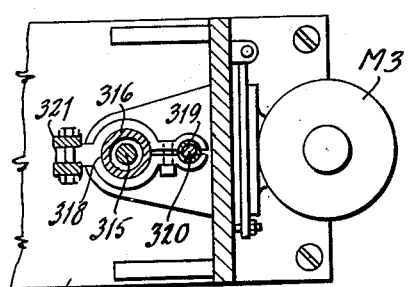
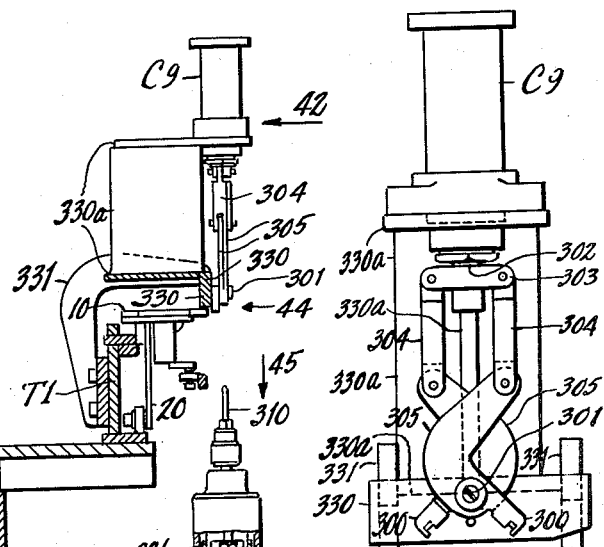
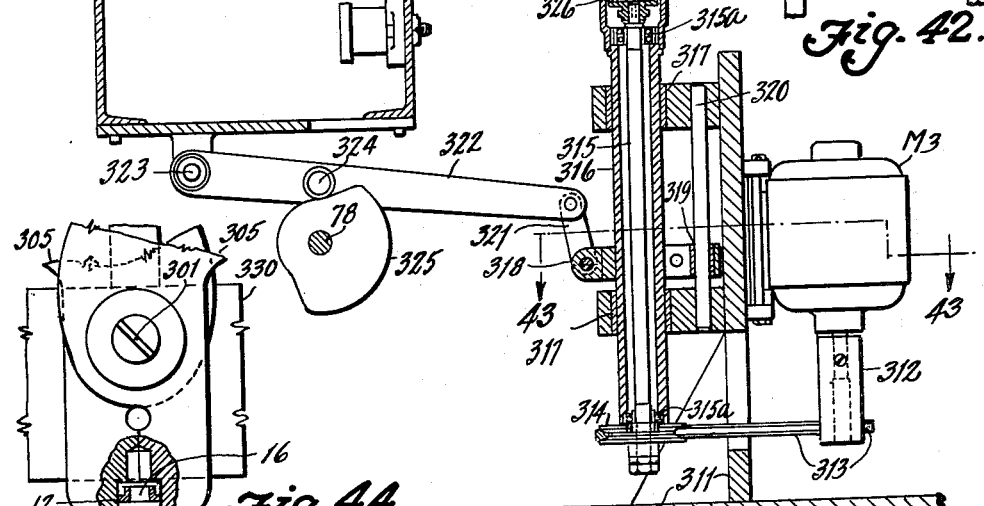
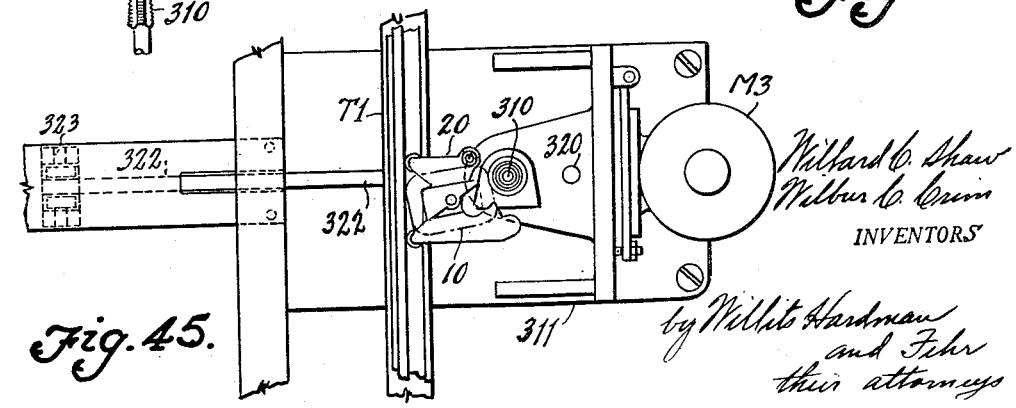
Willard C. Shaw
Wilbur C. Crim
INVENTORS
by Willits Hardman
and Fehr
their attorneys

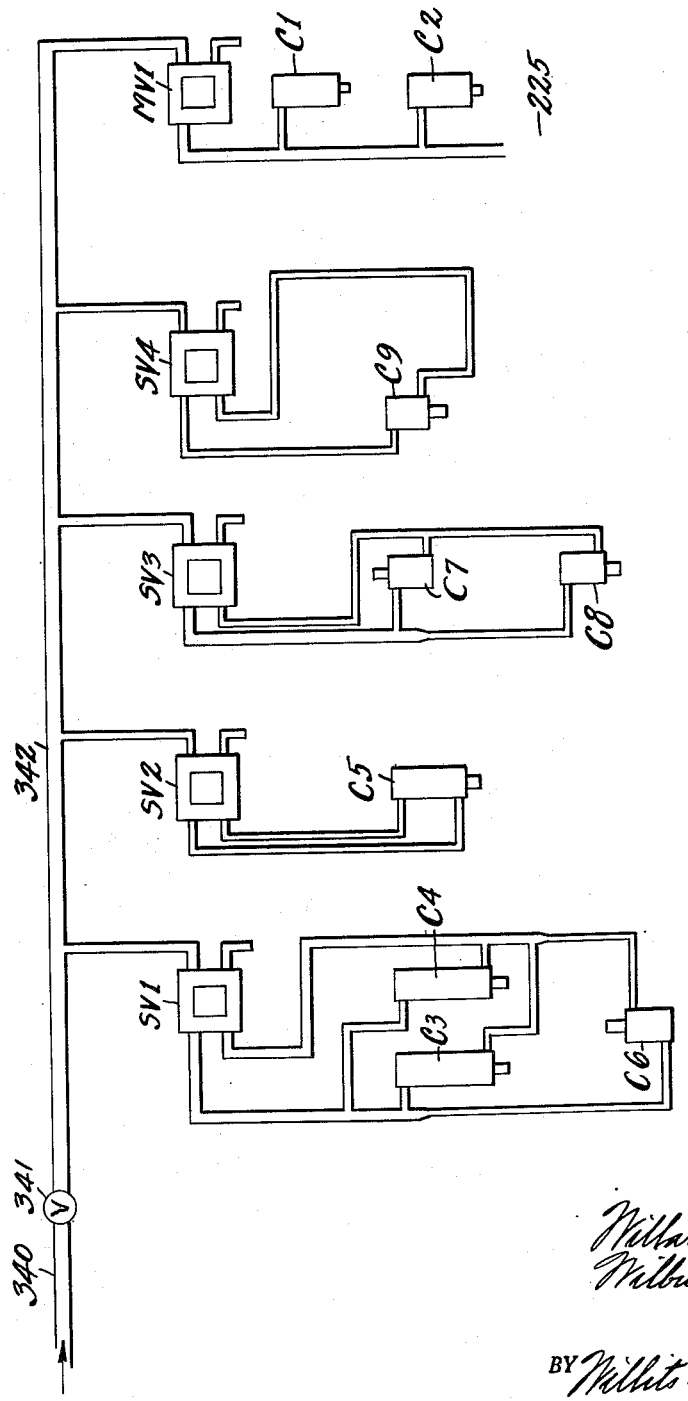

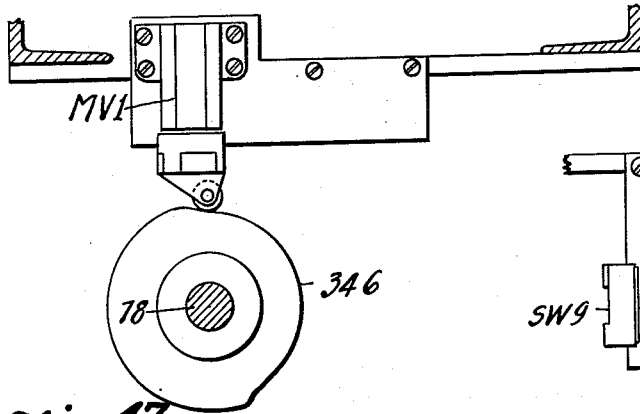
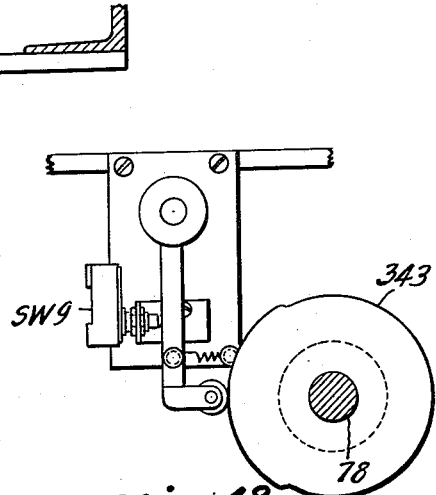
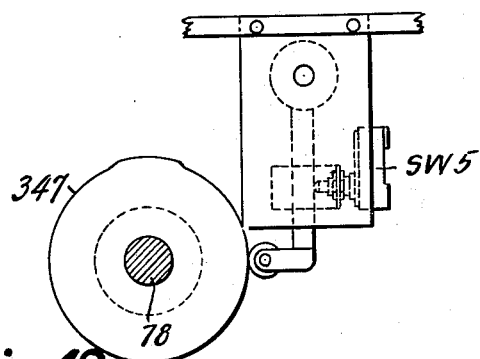
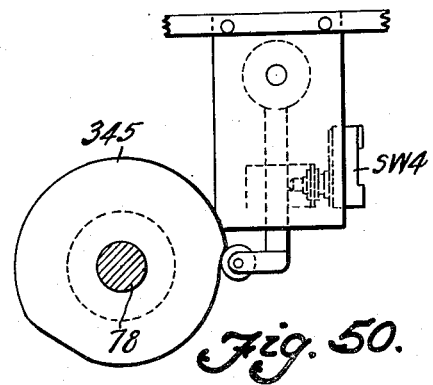
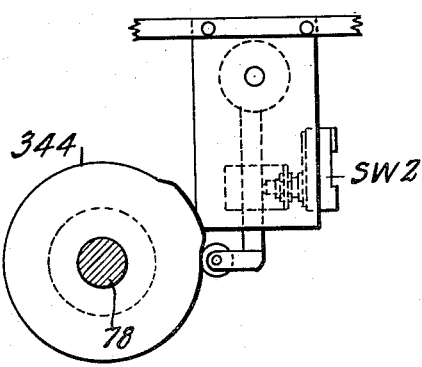

United States Patent Office 2,696,321
Patented Dec. 7, 1954

2,696,321

ASSEMBLING MACHINE

Willard C. Shaw and Wilbur C. Crim, Anderson, Ind., assignors to General Motors Corporation, Detroit, Mich., a corporation of Delaware Application August 9, 1951, Serial No. 241,028

4 Claims. (Cl. 216—25)

This invention relates to the manufacture of electrical coils made by winding a relatively stiff copper ribbon together with an insulating ribbon. Such coils are used for example as the field winding of an engine starting electric motor.

An object of the invention is to facilitate preparation of the coil as it is received from a winding machine for a subsequent operation of enveloping the coil in a non-conducting sheath preferably of plastic. To accomplish this object the present invention provides a machine comprising a plurality of work holders each adapted to support a coil, a conveyor for moving the work holder, means for indexing the conveyor to locate the holders successively at stations when operations are performed upon the coil. These operations include burning off the surplus end portion of the insulating ribbon, binding an end portion of the coil into proper location to provide a lead, taping the coil to maintain its turns compacted and piercing and tapping a hole in a lead of the coil.

Further objects and advantages of the present invention will be apparent from the following description, reference being had to the accompanying drawings wherein a preferred embodiment of the present invention is clearly shown.

In the drawings:

Figs. 3 and 4 and 5 are plan, front and side views, respectively, of one of the work holders. Fig. 3A is a plan view of a work holder showing certain parts in position other than shown in Fig. 3.

Fig. 6 is a diagrammatic plan view of the machine.

Fig. 9 is an enlarged view in the direction of arrow 9 of Fig. 7.

Fig. 10 is a view in the direction of arrow 10 of Fig. 9.

Fig. 11 is a fragment of a clutch control associated with the apparatus shown in Figs. 9 and 10.

Fig. 14 is a plan view of the terminal lead binder at stations 3 and 4.

Fig. 15 is a sectional view on line 15—15 of Fig. 14.

Fig. 15A is a sectional view on line 15A—15A of Fig. 15.

Fig. 15B is a view in the direction of arrow 15B of Fig. 15.

Fig. 16 is a view similar to Fig. 14 showing certain parts in positions other than shown in Fig. 14.

Fig. 16A is a fragmentary view showing a part of Fig. 15 in a different position.

Fig. 17 is a view in the direction of arrow 17 of Fig. 14.

Fig. 18 shows a fragment of the coil and the steps of bending out a coil end portion to provide a lead.

Fig. 20 is a view in the direction of arrow 20 of Fig. 19.

Fig. 21 is a view in the direction of arrow 21 of Fig. 20.

Fig. 22 is a view in the direction of arrow 22 of Fig. 21.

Fig. 23 is a sectional view on line 23—23 of Fig. 21.

Fig. 23A is a sectional view on line 23A—23A of Fig. 23.

Fig. 24 is a sectional view (enlarged) on line 24—24 of Fig. 22.

Fig. 27 is an enlarged sectional view of coil at station 8.

Fig. 28 is a sectional view of the work holder track and the tape-applying mechanism at station 8.

Fig. 29 is an enlarged plan view of the tape-applying mechanism at station 8.

Fig. 30 is a plan view of the machine at the tape sealing device at station 9 and a portion of the machine adjacent thereto.

Fig. 34 is a front view of a mechanism at station 11 for punching a hole in a coil lead.

Fig. 35 is a sectional view on line 35—35 of Fig. 34.

Fig. 36 is a sectional view on line 36—36 of Fig. 34.

Fig. 37 is a sectional view on line 37—37 of Fig. 36.

Fig. 38 is an enlarged portion of Fig. 36.

Fig. 39 is a view in the direction of arrow 39 of Fig. 38.

Fig. 40 is a sectional view on line 40—40 of Fig. 39.

Fig. 41 is a sectional view of the work holder track and the hole tapping mechanism at station 12.

Fig. 42 is an enlarged view in the direction of arrow 42 of Fig. 41.

Fig. 43 is a sectional view on line 43—43 of Fig. 41.

Fig. 44 is an enlarged fragmentary view in the direction of arrow 44, of Fig. 41 showing coil lead gripping jaws engaging that portion which has been punched preparatory to receiving a tap appearing in this view.

Fig. 45 is a view in the direction of arrow 45 of Fig. 41.

Fig. 46 is an hydraulic diagram.

Fig. 47 is a side view of a cam operated valve.

Figs. 48–51 are side views of cam operated switches.

THE COIL

Figure 1:
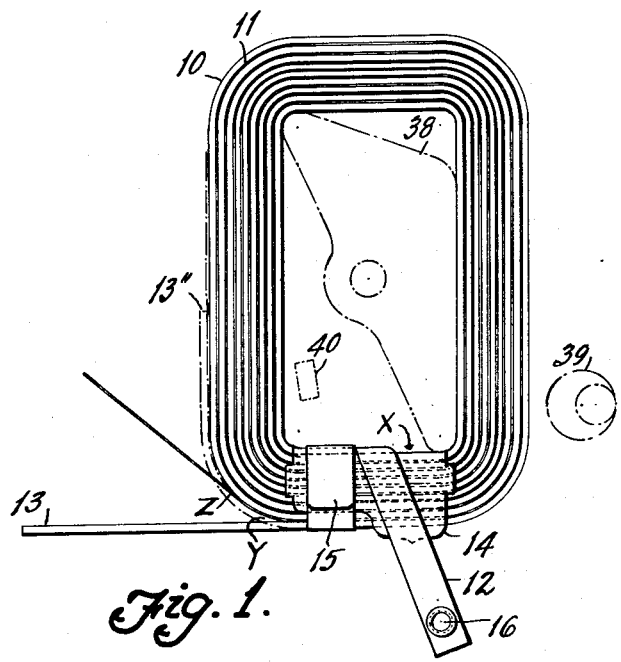
Figs. 1 and 2 are plan and edge views respectively of a coil which is worked on by the present machine.
Figure 2:
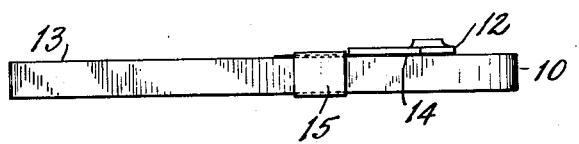

Referring to Figs. 1 and 2, the coil operated upon by the machine comprises turns of copper ribbon 10 wound together with a non-conducting ribbon 11 upon a form. The length of copper ribbon has a preformed terminal lead 12. As the coil comes off the coil winder, the outer end of the coil is located at 13″ and is bent to position 13 by the machine to provide another coil terminal lead. An insulating piece 14 is manually inserted between lead 12 and the coil. A piece of tape 15 is wrapped around the coil to keep its turns compacted. A hole 16 is pierced and tapped in lead 12. The excess of ribbon 11 is removed by burning it off at X and Y.

THE WORK HOLDER

Each coil holder 20 shown in Figs. 3–5 comprises a horizontal plate 21 carrying rollers 22 and a vertical plate 23 carrying roller 24. Rollers 22 are received between rails 25 and 26 (Fig. 7) and (Fig. 12), of track section. These rails are attached to a bar 27 supported by a bar 28 supported by a bar 29 supported by a cross-bar 52. Roller 24 is supported by bar 29 and one side of the roller 24 bears against the outer edge of a bar 30 attached to bar 29. The plates 21 and 23 support a bearing 32 for a shaft 33 attached to a lever 34 which carries a roller 35 for engaging cam plates 36 and 37 (Fig. 6) which cause a coil holder pad 38, attached to shaft 33, to move from the position shown in Fig. 3 to the position shown in Fig. 3A in order to cause the coil 10 (resting upon plate 21 and surrounding the pad 38) to engage a disc 39, a lug 40 and a plate 41 which function to keep the coil turns compacted. Disc 39 has an eccentric hole which receives a screw 39a by which the disc 39 is attached to plate 21 in the position of angular adjustment required to fit the coil. Lug 40 is provided by a bar 40a which screws 40b, passing through slots 40c in the bar, secure to plate 21 in the position such that lug 40 fits the coil. The plate 41 is one of several different ones each of which is attached to a rod 42 received by a tube 43 attached to plate 21. The particular plate 41 needed to fit a particular coil is secured by a screw 44. The turning of plate 41 clockwise by reason of engagement of a coil 10 therewith is limited by engagement of the plate 41 with a short rod 45 welded to plate 21. By adjusting the abutment members 39 and 40 and by substituting other plates 41 for the one shown, the holder can be adapted to retain coils of different numbers of turns within certain limits.

When the roller 35 is moved past a cam 36 or 37 a torsion spring 46 returns the pad 38 to the position shown in Fig. 3, rotation of the pad 38 clockwise being arrested by reason of engagement of a surface 47 (Fig. 3A) of lever 34 with plate 23. A spring 48 (Figs. 4 and 5) bears on a washer 49 attached to shaft 33 to urge the pad 38 against the plate 21.

THE MACHINE FRAME AND CONVEYOR

Figure 7:
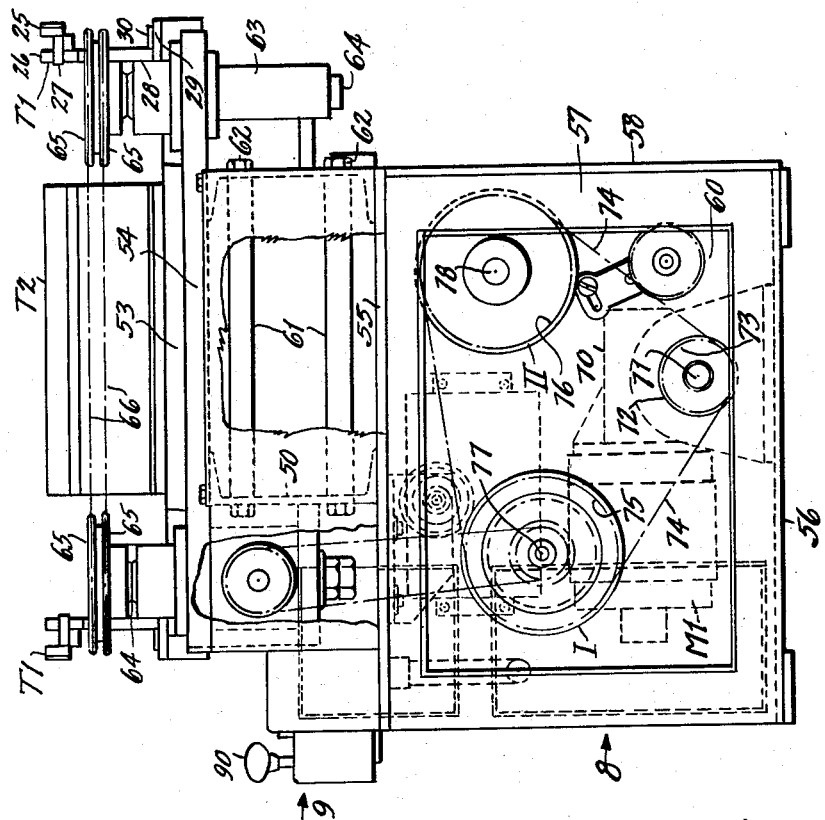
Fig. 7 is an enlarged view in the direction of arrow 7 of Fig. 6.

Referring to Fig. 6, there are two long track sections T1 and two short track sections T2 each constructed as described with reference to Figs. 7 and 12. Parallel channels 50 support spacers 51 which support bars 52 which support tracks T1. Tracks T2 (Figs. 7 and 8) are supported by bars 53 supported by plates 54 supported by channels 50. Channels 50 are supported above the flow by leg-frames (not shown) and by a box-like structure (Figs. 7 and 8) comprising horizontal plates 55 and 56 and vertical end plates 57 and vertical side plates 58 and a vertical plate 60. Channels 50 are secured in spaced relation by spacers 61 and tie bolts 62 (Fig. 7).

Figure 12:
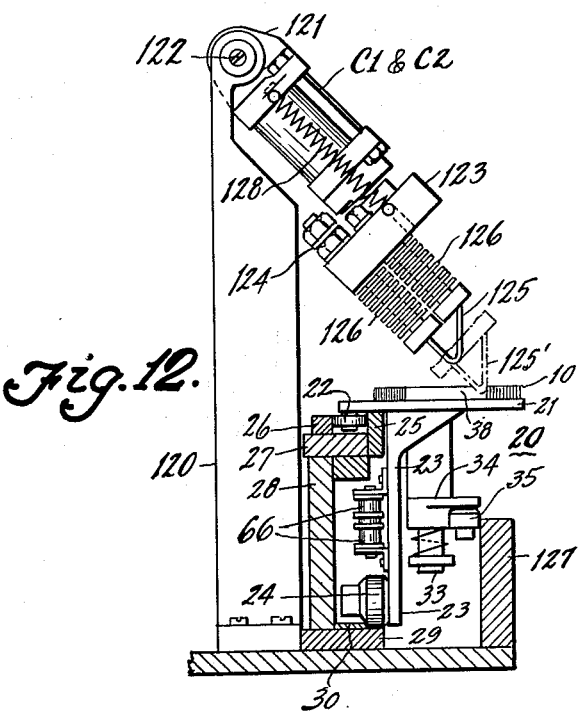
Fig. 12 shows a section of the work holder track at stations 2 and 10, a side view of a work holder, a coil in section, and an insulating ribbon burn-off device.
Figure 13:
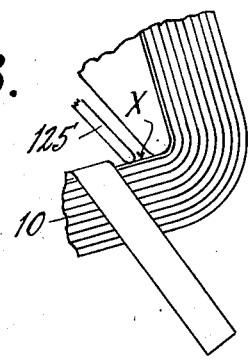
Fig. 13 shows a fragment of the coil and the hot-wire of the burn-off device.

Plates 54 support bearings 63 for shafts 64 supporting sprocket 65 which receive conveyor chains 66 attached pivotally to the work holders 20 as shown in Fig. 12. One of the shafts 64 (Fig. 8) is driven by an electric motor M1 which is connected by speed reducing gearing in a housing 70 with a shaft 71 connected by a torque-limiting clutch 72 with a sprocket 73 which a chain 74 connects with sprockets 75 and 76 journalled on shafts 77 and 78 respectively and connected therewith by clutches I and II the details of which are disclosed in the copending application of Burge et al., Ser. No. 140,808 filed January 27, 1950. Clutch II which is controlled in a manner to be described connects sprocket 76 with the shaft 78 which is the cam shaft and which extends lengthwise of the machine and is journalled in bearings (not shown) supported by channels 50. Once during each revolution of shaft 78, clutch I is tripped to cause sprocket 75 to be connected with shaft 77 for ⅓ revolution thereof which is the amount of movement required for conveyor indexing to move the work holders along the tracks a distance equal to the spacing of the work holders.

Figure 8:
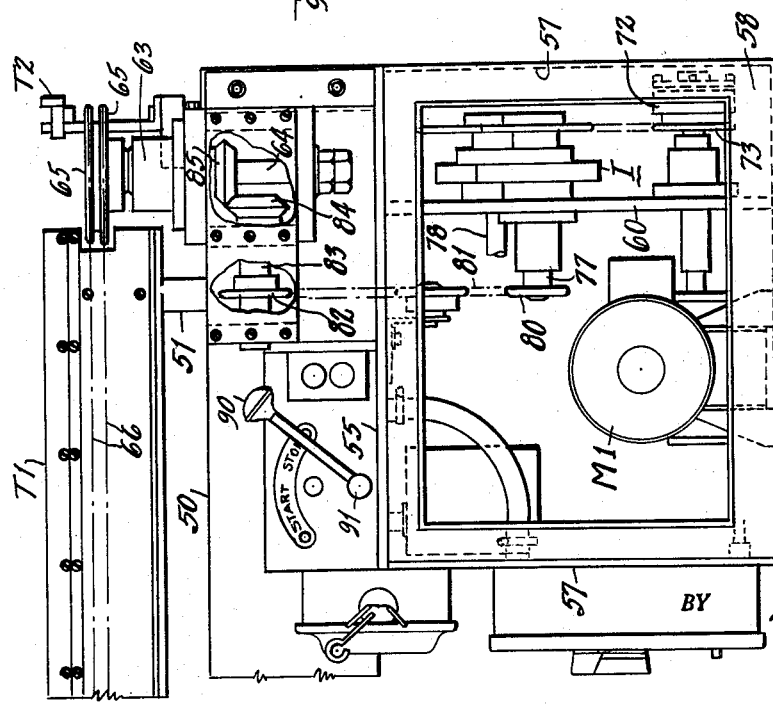
Fig. 8 is a view in the direction of arrow 8 of Fig. 7.

Shaft 77 is connected with a sprocket 80 connected by a chain 81 with a sprocket 82 attached to a shaft 83 which drives a bevel gear 84, bevel gear 84 meshing with a bevel gear 85 attached to shaft 64 (Fig. 8).

Clutch II is tripped by moving a lever 90 (Fig. 9) counterclockwise to start position. This results in like rotation of a shaft 91, an arm 92, left movement of a link 93, clockwise movement of a lever 94 about its pivot 95, upward movement of a link 96 and counterclockwise movement of a lever 97 (Fig. 11) and a pawl 98 to retract the latter from a notch 99 of a lever 100 pivoted at 101 on plate 60. Then a spring 102 is released to cause counterclockwise movement of lever 100 and a latch lever 103 to retract it from a notch in a driven-disc 104 of clutch II and to cause the latter to be driven by the sprocket 76 as described in the Burge application referred to.

To disengage clutch II, lever 90 is moved to stop position to allow a spring 105 (Fig. 9) to urge the pawl 98 to normal position preparatory to its being received again by the notch 99 of lever 100 which is moved clockwise to its normal position by reason of engagement therewith by a roller 106 (Fig. 11) carried by disc 104. As lever 100 moves toward its normal position preparatory to being caught by the pawl 98, a spring 107 transmits motion to lever 103 to cause it to be pressed yieldingly against the disc 104. If the pawl 98 is in clutch throw out position by reason of the return of lever 90 to stop position, lever 100 will be caught in its clutch throw-out position and spring 107 will be effective to cause lever 103 to catch in the notch of disc 104 and concurrently to effect clutch disengagement.

Motion of lever 90 clockwise to stop position can be effected electrically by causing energization of a solenoid S5 which causes right movement of its armature 110, a link 111 and the upper end of a lever 112 attached to shaft 91. As shaft 91 approaches the end of its clockwise movement, a lever 113 opens a normally closed switch SW6 in series with solenoid S5 so that this solenoid does not draw current while the machine is at rest as well as while the machine is operating.

The work-holder center lines are represented by short lines w in Fig. 6. The various stations are as follows:

Station 1. Loading and unloading of coils.
Station 2. Burn off inside end of paper ribbon.
Stations 3 and 4. Bend out terminal lead (two operations).
Station 5. Insert insulator 14.
Station 6. Insert insulator at Y in Fig. 1.
Station 7. Apply tape to three sides of coil.
Station 8. Apply tape to fourth side of coil.
Station 9. Heat seal the tape.
Station 10. Burn off outside end of paper ribbon.
Station 11. Punch hole in terminal lead 12.
Station 12. Tap punched hole in terminal lead 12.

*Stations 2 and 10.—Burn off paper ribbon*

The paper ribbon is burned off at X (Fig. 1) at station 2 and at Z at station 10 by similar apparatuses each comprising a bracket 120 which supports a plate 121 secured in the required position of adjustment by a screw 122. Plate 121 supports an air cylinder C1 for stations 2 and C2 for station 10. This cylinder contains a piston connection with an insulating block 123 which supports terminals 124 connected with the ends of a wire 125 insulated except at its loop by heat dissipating insulators 126. At the proper time, compressed air is admitted to the upper end of the cylinder to cause the wire 125, then red hot by passage of electric current, to move to position 125' to burn the paper ribbon 11 at X for station 2 and at Y for station 10, the brackets 120 at stations 2 and 10 being located suitably for the functions at these stations 7.

At stations 2 and 10, the roller 35 of the work-holder engages a cam plate 127 so that the coil will be located as indicated at 10' in Fig. 3A.

Before the next conveyor indexing, air pressure is cut off and the upper end of the cylinder is vented so that springs 128 which connect the block 123 with the cylinder head are permitted to retract the hot wire 125.

*Station 3.—Terminal lead bending, first operation*

Referring to Figs. 14–18, the coil end is bent from position 13'' to position 13' by pushing against its end edge by a finger 130 which a screw 130a and a bushing 130b (Fig. 15A) secure to a bar 131 (Fig. 15) guided for movement along two rods 132 supported by brackets 133 and 134. Bar 131 is connected by sleeve 135 (Fig. 17) with a plate 136 connected with a rod 137 connected with a piston in a cylinder C3 supported by bracket 134. When compressed air is admitted to the upper (in Fig. 14) end of cylinder C3, the finger 130 moves to the position shown in Fig. 16 to push the coil end to position 13'. Its surface 130s which engages the coil end is shown in Fig. 15B. Before the next indexing operation, the finger 130 is returned to the position shown in Fig. 14. During indexing, the coil 10 which was at station 3 moves to station 4; and, as it moves, it causes the finger 130 to swing clockwise on the bushing 130b (Fig. 16A) until the coil has passed the finger 130. Then finger 130 gravitates to its normal position preparatory to the next coil lead bending operation.

*Station 4.—Terminal lead bending, second operation*

In this operation, a finger 130' pushes the lead from position 13' to position 13'' (Figs. 16 and 18). The apparatus for performing this operation is like that at station 3. Therefore corresponding parts are marked with the same reference numbers with primes affixed The cylinder at station 4 is C4. The lead 13 is bent against the plate 41 which is curved. When the disc 130' is retracted, lead 13 springs back into substantially straight condition. The finger 130' has a coil end engaging surface like 130s (Fig. 15B) but at a different angle to suit the coil end when at 13'.

At stations 3 and 4 the coil is located in position 10' as shown in Fig. 3 so that its turns are retained in compacted condition while the lead 13 is bent.

Station 7.—Taping the coil on three sides

Referring to Figs. 19–26, the tape 140 (Fig. 20) is supplied from a roll 141 supported by a wheel 142 pivotally supported by a bracket 143. The side of the tape indicated by arrow 140b is adhesive. The tape 140 is curved slightly to stiffen it and to permit it to pass through a tube 144 supported by a block 145 attached to bracket 143. A block 140a guides the tape to the tube 144. Tube 144 is notched to receive a smooth metal roller 146 and a knurled metal roller 147 between which the tape passes. Roller 146 is carried by a lever 148 pivoted at 149 and urged counterclockwise by a spring 150 connecting lever 148 with a spring tension adjusting screw 151 which is moved lengthwise by turning a nut 151n. Thus the tape is yieldingly pressed against roller 147. To prevent sticking of the tape to the roller 147, moisture is applied to said roller by a felt roll 152 carried by a lever 153 pivoted at 154 and supplied with a liquid by a pipe 155 connected with a vessel 156 supported by a bracket 157.

Roller 147 is caused to rotate counterclockwise intermittently by a mechanism which includes a servo cylinder C5 containing a piston connected by a rod 160 (Figs. 21 and 22) with a rack 161 which meshes with a pinion 162 connected with a disc 163 (Figs. 22 and 24) pivotally supporting pawls 164 which leaf springs 165 urge against a ratchet 166 connected with a shaft 167 (Fig. 24) connected with roller 147. Rack 161 has threaded, round end portions which receive nuts 167 and 169 respectively (Fig. 22). A spring 168 confined between nut 167 and a rack guide 170 urges the rack 161 to the left to cause the pawls 164 to be rotated counterclockwise by disc 163 so that they back along the ratchet 166 without causing any tape feeding movement. When rod 160 moves right a bar 171 attached thereto engages nut 169 to cause right movement of rack 161 to cause feeding of tape.

When 160 moves left the tape fed below block 145 (Fig. 20) is cut off by reason of cooperation with block 145 by a shear blade 172 attached to a shaft 173 journalled in bearings 174 (Fig. 23) and urged down as viewed in Fig. 23 by a spring 175 which pushes against a pinion 176 meshing with a rack 177 guided by a block 178 supported by bracket 143 and by blocks 179 and 180 which are supported by bracket 143 and together provide a cam surface 181 (Fig. 23A). Rack 177 has a hard metal end piece 182 engaged by a lever 183 (Fig. 21) pivoted over a pin 184 carried by bar 171 and urged clockwise by a torsion spring 185. During left movement of rod 160, lever 183 pushes on rack 177 and effects counterclockwise rotation of pinion 176 and blade 172 to shear the tape. By the time the tape has been sheared, lever 183 will have been cammed by surface 181 away from the rack end piece 182 whereupon the rack 177 will be moved right by a spring 186 which surrounds the round left end of rack 177 (Fig. 23) and pushes against a collar 187 of the rack to retract the blade 172.

Thus right movement of piston rod 160 causes tape feeding and left movement thereof causes tape severing.

Figure 25:
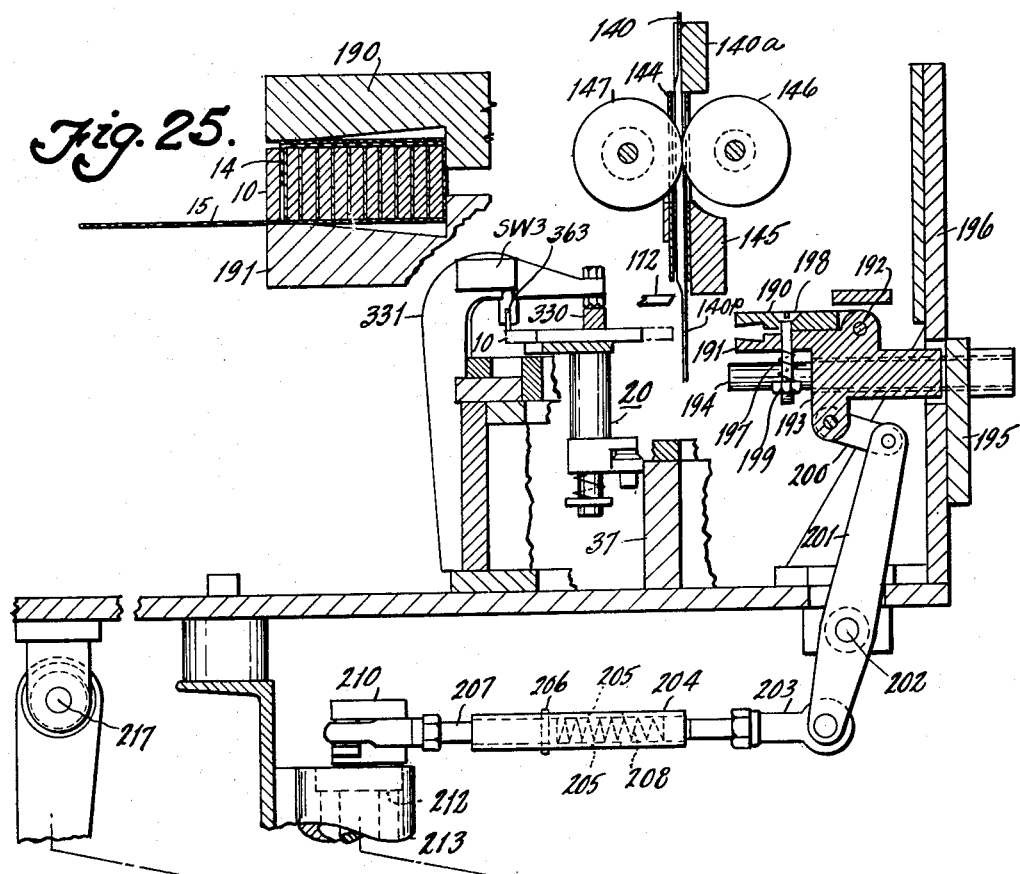
Fig. 25 is an enlarged sectional view of a coil and the tape applying jaws.
Figure 26:
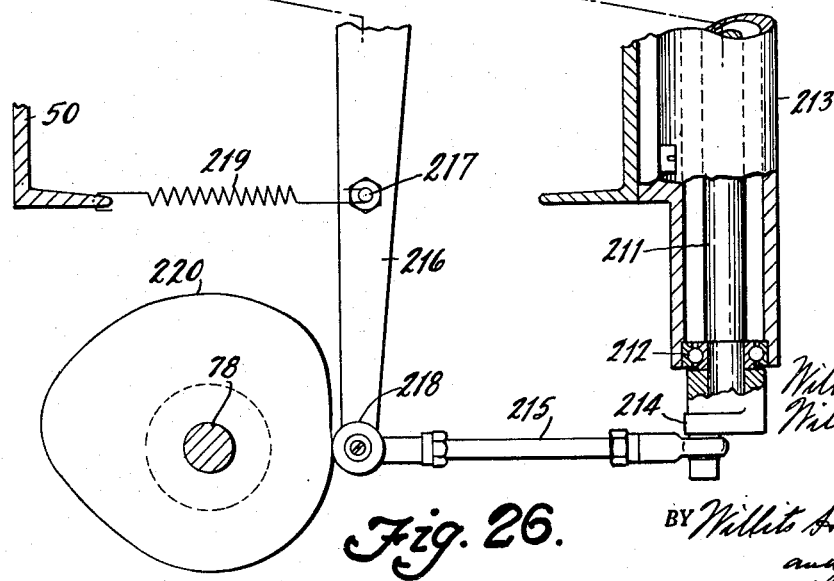
Fig. 26 is a sectional view of the work holder track and tape-applying-jaw operating mechanism at station 7.

Referring to Figs. 25 and 26, the piece of tape 140v hanging below the block 145 with its sticky surface adjacent the coil 10 is caused to move against the coil just before it is severed by blade 172. After severing, the tape is caused to be wrapped about three sides of the coil as shown in Fig. 25 by jaws 190 and 191. Jaw 190 (Fig. 26) is pivoted on a rod 192 supported by a carriage 193 which provides jaw 191. Carriage 193 is guided for horizontal movement by two rods 194 (one shown in Fig. 26) which are supported by a plate 195 fixed to a bracket 196. The jaws are urged toward each other by a spring 197 surrounding a screw 198 connected with jaw 190 and passing loosely through jaw 191 and carrying a nut 199 against which the spring 197 pushes.

Carriage 193 is connected by a link 200 with a lever 201 pivoted at 202 and connected with a link 203 providing a tube 204 having diametrically opposite longitudinal slots 205 which receive the ends of a cross pin 206 carried by a link member 207. A spring 208 in tube 204 urges the links apart, said separation being limited by engagement of pin 206 with the left ends of slots 205.

Link 207 is connected with a lever 210 attached to a shaft 211 journalled in bearings 212 supported by a tubular bracket 213 and attached to a lever 214 which a link 215 connects with a lever 216 pivoted at 217 and carrying a roller 218 which a spring 219 urges against a cam 220 driven by shaft 78.

During counterclockwise (Fig. 26) rotation of cam 220, the carriage 193 is moved left first to press the tape against the coil just before it is cut off and then to effect the tape wrapping operation shown in Fig. 25. Finally the carriage 193 is retracted to clear the coil before the next conveyor-indexing operation.

Figure 53:
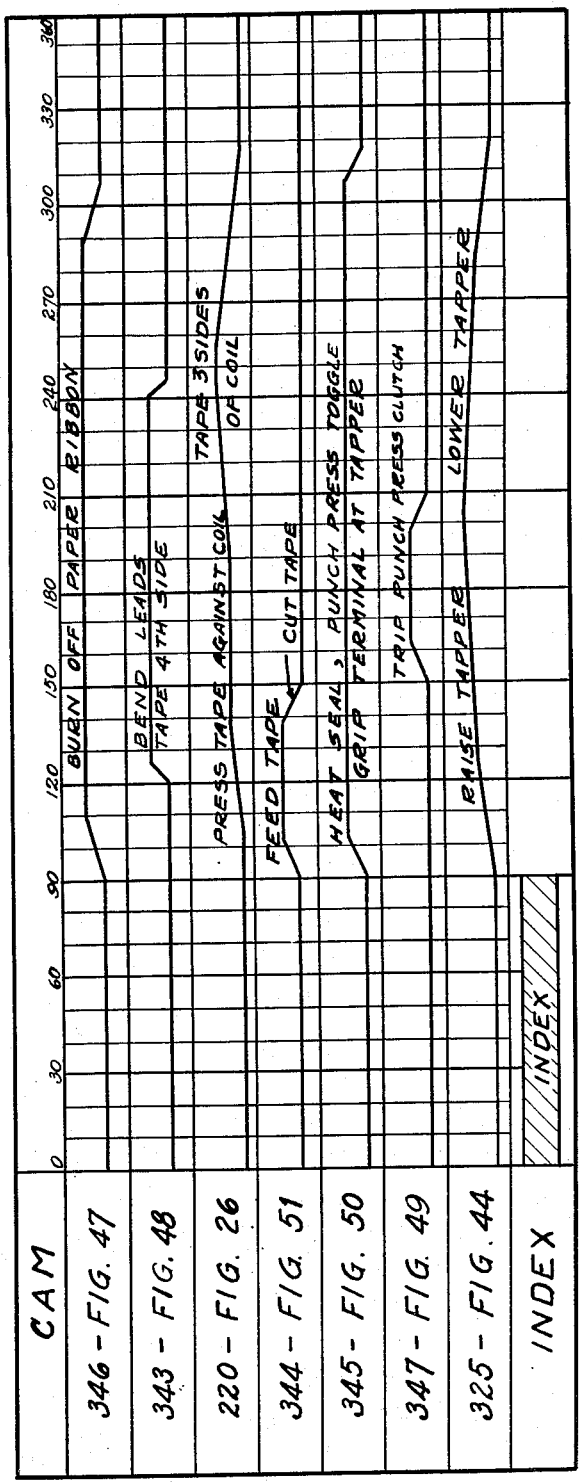
Fig. 53 is a chart of cam operations.

Fig. 53 shows the timing of the functions of cam 220.

Station 8.—Taping fourth side of coil

The tape piece 140p is applied to the inside or fourth side of the coil 10 as shown in Fig. 27 by an upwardly moving roller 221 fixed to a rod 222 guided by a bracket 223 attached to a tube 224 having diametrically opposite slots 225 which receives a pin 226 urged down by a spring 228. Pin 226 is connected by a link 227 with a lever 229 pivoted at 230 and connected by a link 231 with a piston rod 232 attached to a piston in a cylinder C6. When compressed air is admitted to the upper end of cylinder C6, rod 232 moves down and rod 222 moves up and roller 221 presses the tape against the inside of the coil. Then compressed air flows from a pipe 235 (Fig. 29) to blow the unapplied tape end portion 236 to position 236' so that its sticky surface adheres to the tape portion on top of the coil.

Station 9.—Heat sealing the tape

Figure 32:
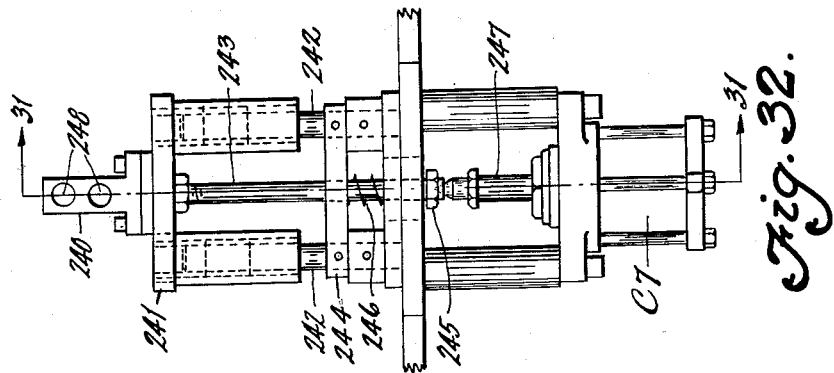
Fig. 32 is a front view of the tape sealing device at station 9.
Figure 33:
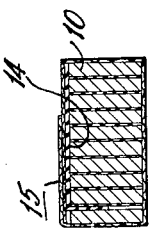
Fig. 33 is a sectional view of a coil with tape applied thereto.

The tape portion at 236' (Fig. 27) is sealed against the upper tape portion as shown in Fig. 33 by lowering a heated iron 240 (Figs. 31 and 32) insulatingly supported by a bar 241 guided for vertical movement by posts 242 and connected with a rod 243 which passes through a bar 244 and receives a nut 245 which confines a compression spring 246 urging the iron 240 downwardly with a force determined by the adjustment of the nut 245.

The iron 240 is held up when compressed air is admitted to the lower end of a cylinder C7 containing a piston connected with a rod 247 which engages the lower end of rod 243. When compressed air is admitted to the upper end of cylinder C7 and its lower end is vented, rod 247 moves down and spring 246 is permitted to lower the iron 240.

The iron 240 is heated by electrical heating elements 248 located in recesses of the iron.

Station 11.—Punching hole in terminal 12

Referring to Figs. 34–40, a frame 250 supports an electric motor M2 which drives, through speed-reducing gearing in a housing 251, a shaft 252 (Fig. 36) connected with a sprocket 252s connected by a chain 253 with sprocket 254 (Fig. 34) connectible by a Hilliard clutch 255 with a shaft 256 supported by bearings 257 and driving a crank disc 258 which rotates a crank pin connected by a link 259 with a rod 260 (Fig. 36) guided by a sleeve 261 attached to frame 250.

Rod 260 carries a punch holder 262 (Fig. 38) which supports a punch stem 263 to which a punch 264 is attached. Holder 262 supports a tube 265 enclosing a spring 266 which urges a pressure pad 267 upward to urge the terminal 12 against a block 268 fixed to a ram 269 guided by a sleeve 270. Block 268 carries a stripper pin 271 which a spring 272 urges downwardly.

Movement of block 268 from an upper or retracted position to the advanced position shown in Fig. 36 is effected by admitting compressed air to the right end of a cylinder C8 to effect the straightening of toggle links 274 and 275 pivotally connected at 276 with a piston rod 277 connected with a piston within cylinder C8. Links are pivotally connected by pins 278 and 279, respectively, with frame 250 and ram 269 respectively.

A bracket 268a clamped to block 268 provides pivots 280 for levers 281 the ends 281a of which are urged apart by a spring 282 connecting the levers, said spring urging the ends 281b together. Rod 260 carries a clamp bracket 283 (Fig. 38) which supports a pin 284 having a conical end 285 which, while ram 269 is down and rod 260 is moving up, cams the lever ends 281b apart to cause pins 281p carried by the lever ends 281a to grip the terminal 12 (Fig. 1) to locate it while the hole 16 is being pierced by the punch 264. When the rod 260 moves down, pin 284 is retracted from the lever ends 281b, and spring 282 is permitted to cause the lever ends 281b to be urged against a stop pin 286 carried by ram 269. The levers then are free from the terminal 12 and the ram 269 moves up before the next conveyor-indexing operation.

The cycle of movement of rod 260 is started by tripping the clutch 255, which urges a disc 290 (Fig. 35) counterclockwise against a lever 291 pivoted at 292 and urged clockwise by a spring 293 into engagement with the disc 290. When a solenoid S4 is energized, its armature 294, connected by a link 295 with lever 291, moves down to retract the lever 291 from engagement with the stop 296 of disc 290. The Hilliard clutch then automatically engages. Before the end of one revolution of disc 290, the solenoid S4 becomes de-energized so that spring 293 causes the lever 291 to bear against disc 290 preparatory to receiving the stop lug 296 of disc 290 to arrest movement of the disc and disengage the clutch 255 at the end of one revolution.

*Station 12.—Tapping hole 16 in terminal 12*

Referring to Figs. 41–45, while the work holder 20 is at station 12, the terminal 12 is gripped by jaws 300, pivotally supported at 301 by a bar 330 supporting a bracket 330a which supports a cylinder C9 containing a piston connected by a rod 302 with a bar 303 connected by links 304 with levers 305 which carry the jaws 300. Admission of compressed air to the upper end of cylinder C9 causes the jaws 300 to grip the terminal 12 of that coil 10 then at station 12. While the terminal 12 is thus supported as shown in Fig. 44, a tap 310 moves up to thread the hole 16 in terminal 10 and moves down to clear the terminal before the next indexing operation.

The tap 310 is rotated by an electric motor M3 supported by a bracket 311 and driving a cylinder 312 which receives a belt 313 connecting it with a ground pulley 314 attached to a shaft 315 journalled in bearings 315a supported by a tube 316 which is supported for vertical movement by bearing sleeves 317 supported by bracket 311. Tube 316 is embraced by a clamp bracket 318 which is free to move vertically but which is prevented from rotating by reason of the engagement of a bushing 319 of the bracket by a vertical rod 320 supported by bracket 311.

Bracket 311 is connected by a link 321 with a lever 322 pivoted at 323 and carrying a roller 324 by force of gravity in engagement with a cam 325 driven by cam shaft 78. After the indexing of the conveyor, cam 325 causes the sleeve 316 to move upwardly to raise the rotating tap 310 to move into the hole 16 in terminal 12. After the hole 16 is threaded, the tap 310 is lowered. The shaft 315 is connected with the tap 310 by a conventional clutch 326 which, during the lowering of the tap 310 through the terminal 12, causes reversal of the direction of tap rotation and which, after the tap 310 is retracted from the terminal 12, causes the tap 310 to turn again in the tapping direction.

WORK HOLD DOWNS

Figure 19:
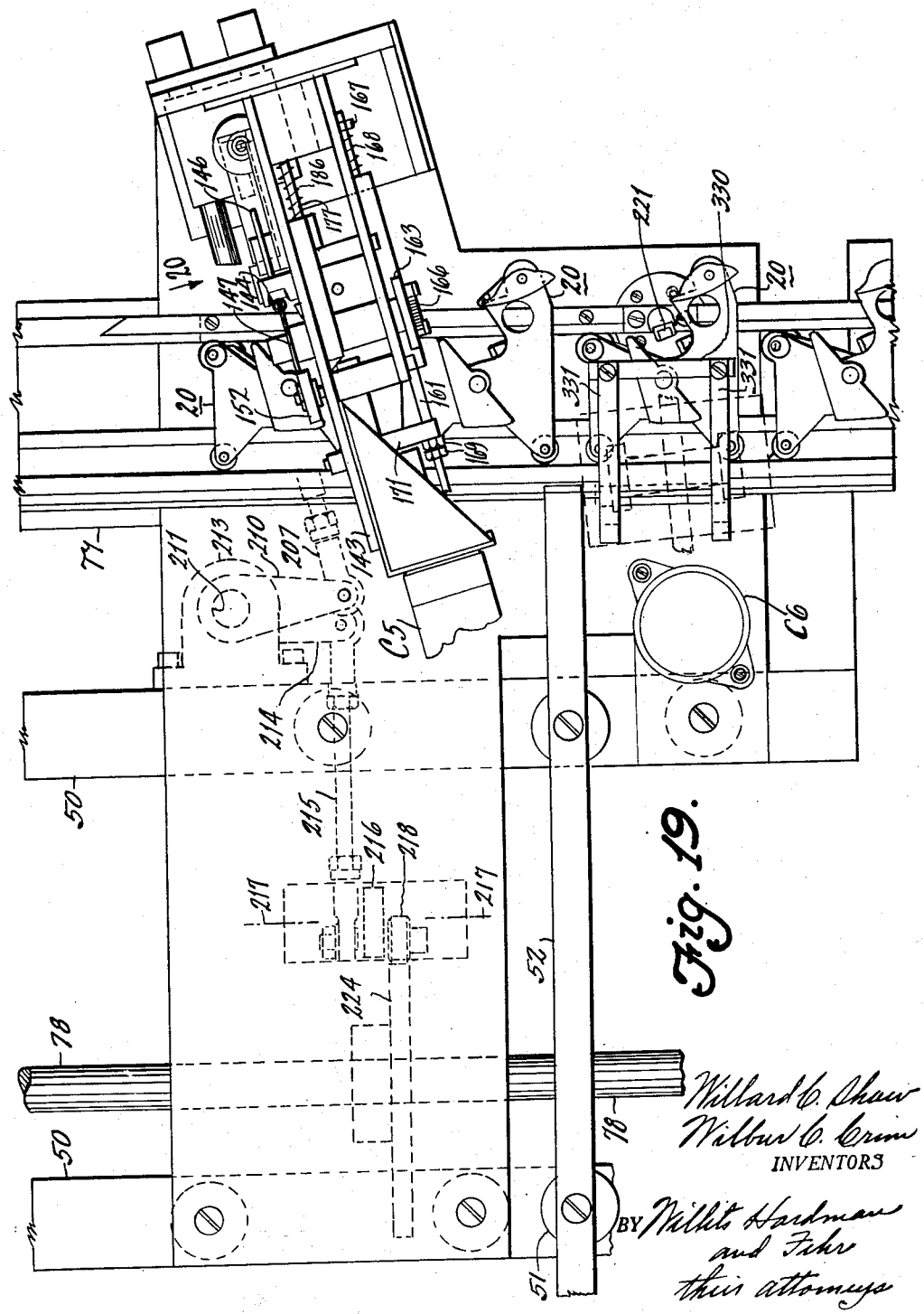
Fig. 19 is a plan view of the taping mechanism at stations 7 and 8.
Figure 31:
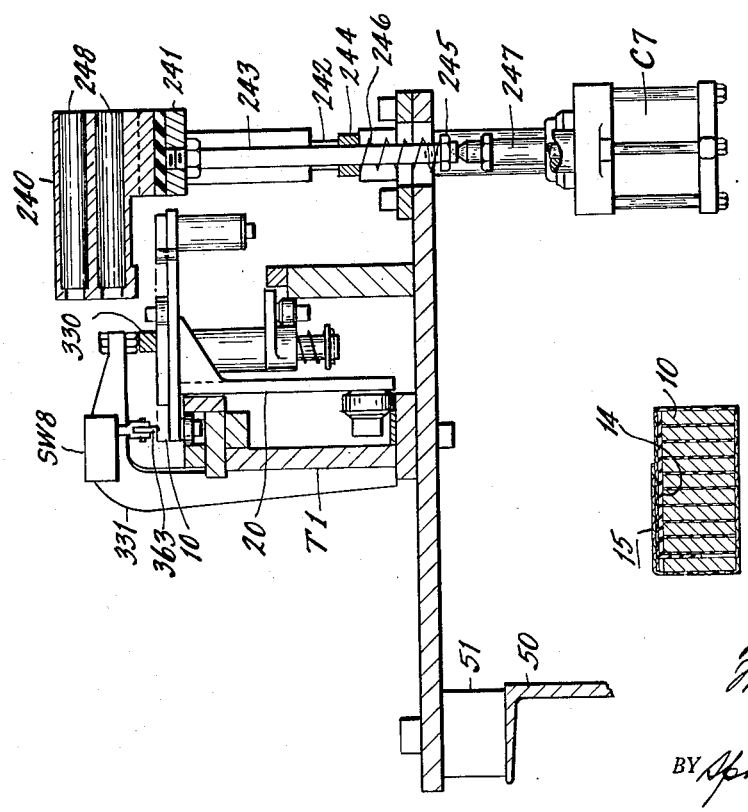
Fig. 31 is a sectional view on line 31—31 of Fig. 32.

Bars 330 supported by brackets 331 are provided at some of the stations for retaining the coils upon the work holders, as shown for example, in Figs. 19 and 28 at station 8, in Fig. 31 at station 10, in Fig. 36 at station 11, in Fig. 41 at station 12.

HYDRAULIC CIRCUIT

Referring to Fig. 46, a pipe 340 is connected by a valve 341 with a manifold 342 which is connected with solenoid controlled valves SV1, SV2, SV3 and SV4 and with a mechanical valve MV1. Valve SV1 controls admission of pressure fluid to the ends of cylinders C3, C4 and C6. Valve SV2 controls the admission of pressure fluid to the ends of cylinder C5. Valve SV3 controls the admission of pressure fluid to the ends of cylinder C7 and C8. Valve SV4 controls the admission of pressure fluid to the ends of cylinder C9. Valve MV1 controls the admission of pressure fluid to the upper ends of cylinders C1 and C2 and to the air jet pipe 225 (Fig. 29).

Valve SV1 is operated by solenoid S6 (circuit VII, Fig. 52) controlled by switch SW9 controlled by cam 343 driven by cam shaft 78 as shown in Fig. 48.

Valve SV2 is operated by solenoid S1 (circuit III, Fig. 52) controlled by switch SW2, controlled by cam 344 driven by cam shaft 78 as shown in Fig. 51.

Valves SV3 and SV4 are operated by solenoids S2 and S3 respectively (circuit IV, Fig. 52) controlled by switch SW4 controlled by cam 345 driven by cam shaft 78 as shown in Fig. 50.

Valve MV1 is operated by cam 346 driven by cam shaft 78 as shown in Fig. 47.

ELECTRICAL CIRCUIT

Figure 52:
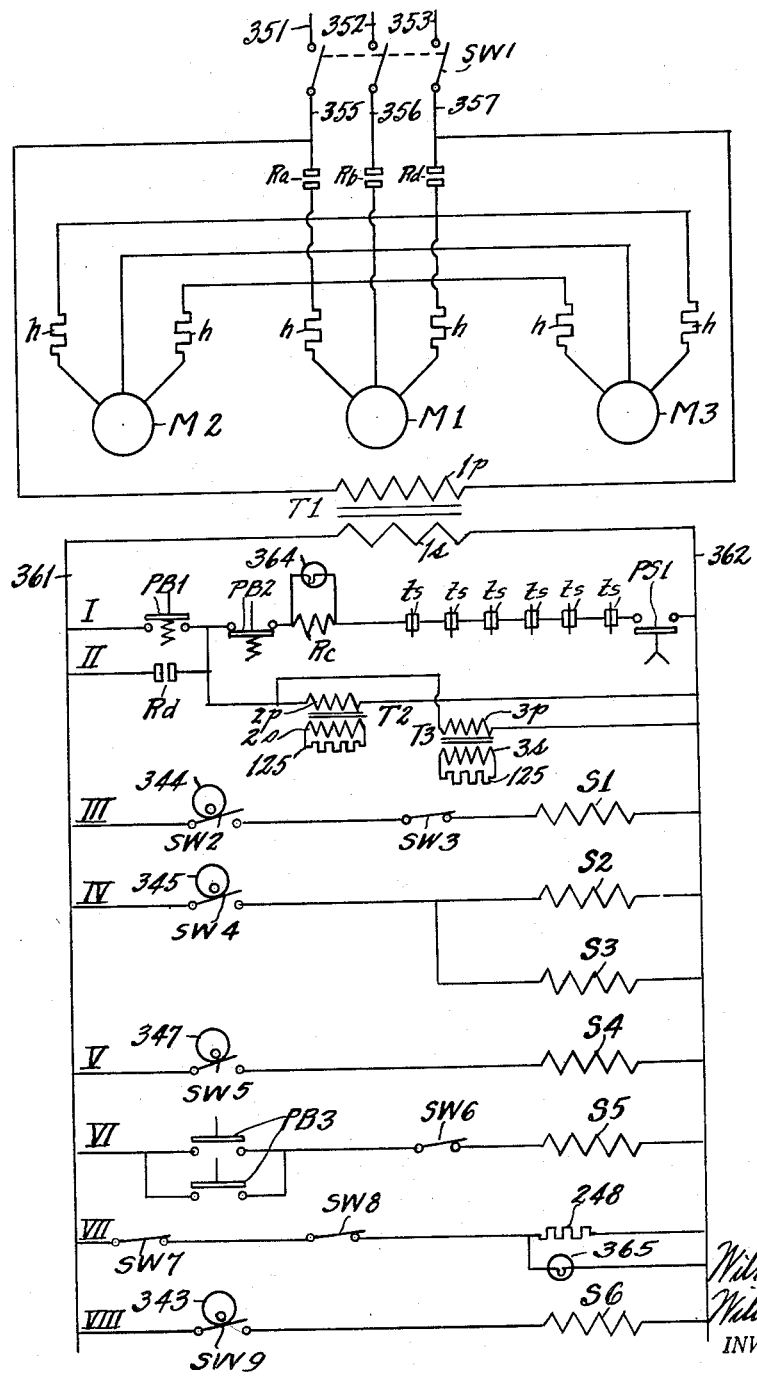
Fig. 52 is a diagram of electrical controls.

Referring to Fig. 52, wires 351, 352, 353 connected with an A. C. source are connected by switch SW1 with wires 355, 356, 357, respectively, connectible by closure of normally open relay contacts Ra, Rb, Rd, with motors M1, M2 and M3. Wires 355 and 357 are connected with primary coil 1P of a transformer T1 whose secondary winding 1s is connected with wires 361 and 362.

Circuit I includes a normally open switch PB1, a normal closed switch PB2, coil Rc of the relay whose contacts are Ra, Rb, Rd referred to and normally open contacts Re in circuit II. Coil Rc is in series with normally closed contacts of thermal overload switches ts which are caused to open by heat produced in resistors h in the circuits of the motors when the current consumed by the motors becomes excessive. Switches ts are in series with a switch PS which closes when pressure fluid is admitted to manifold 342, Fig. 46.

When switch PB1 is closed after switch SW1 is closed, coil Rc receives current and relay contacts Ra, Rb, Rd and Re. Contacts Re by-pass switch PB1 so that it may be released to open by spring pressure.

When contacts Rd close, circuit II is completed, the primary windings 2p and 3p of transformers T2 and T3 respectively receive current and their respective secondary windings 2s and 3s supply current to the hot wires 125 (Fig. 12) at stations 2 and 10.

The tape dispenser control circuit III includes the solenoid S1, the cam switch SW2 and a feeler switch SW3 (Fig. 26) whose actuator 363 is engaged by a coil 10, if present, in the work holder at station 7. If the coil 10 is absent, switch SW3 remains open and tape is not dispensed when cam switch SW2 closes.

The functions of circuits IV and VIII have been described in connection with the hydraulic circuit.

When cam 347 closes switch SW5 in circuit V, solenoid S4 receives current, and the punch press clutch 255 (Fig. 34) is tripped.

The machine is stopped by closing either of switches PB3 in circuit VI. When solenoid S5 receives current, lever 90 (Fig. 9) is moved from "Start" to "Stop" position and switch SW6 opens. When the lever 90 is moved to "Start" position switch SW6 closes.

Circuit VII includes a manually operated switch SW7 and a feeler switch SW8 (Fig. 31) and heaters 248 which heat the iron 240 (Fig. 31). If a coil 10 is absent, switch SW8 (like SW3 in Fig. 26) does not close and the heaters 248 do not receive current. Lamp 365 burns to indicate that heaters 248 are receiving current.

In circuit I, lamp 364 burns to indicate that coil Rc is receiving current which means that motors M1, M2 and M3 are operating.

The timing of the operations effected by the cam shaft driven cams is shown in Fig. 53.

While the embodiment of the present invention as herein disclosed, constitutes a preferred form, it is to be understood that other forms might be adopted.

What is claimed is as follows:

1. In a machine for performing operations on a flat coil made by winding a strip of metal together with an insulating ribbon upon a form, the combination of a conveyor, a plurality of work holders moved by the conveyor, each work holder having a horizontal plate, a pad located upon the plate and adapted to be surrounded by the coil when placed upon the plate, and having abutments respectively for engaging inside and outside turns of the coil, means at a work-station for feeding adhesive tape from a supply roll severing a length of fed tape and applying the tape to three sides only of a certain portion of the coil, means at a following work-station for causing the tape to be pressed against the fourth side of the coil portion, means at said following station for causing the tape at said fourth side to contact the tape applied at the first mentioned station whereby the tape completely surrounds the coil portions, means at a following station for heat sealing the last applied tape portion to a portion of the tape applied at the first mentioned work station and a mechanism for operating the indexing means and the tape applying means.

2. The combination as defined in claim 1 further characterized by provision of means for detecting the presence or absence of a coil at the first mentioned work station and means under control thereby for preventing operation of the means at that station when the coil is absent.

3. In a machine of the character described, apparatus for applying adhesion tape to three sides only of a coil portion of rectangular cross section, said apparatus comprising a tape supply roll holder, a linearly movable member, a servo for moving the member in both directions of its movement, means actuated in response to movement of said member in one direction for causing the tape to be fed from the supply roll on the holder and to cause an end portion thereof to be located adjacent to the coil with its adhesive side facing the coil, means actuated in response to movement of the member in the other direction for cutting off a length of tape sufficient for wrapping around the coil, means operating before tape cutting to move the tape against the coil so that the tape when cut off, will be supported by the coil, and to cause the severed tape portion to be wrapped around three sides only of said coil portion, and a mechanism for controlling the servo and for operating the tape wrapping means.

4. Apparatus according to claim 3 in which the tape feeding means includes a rack, a pinion meshing with the rack, a pawl moved by the pinion, a ratchet engaged by the pawl, a feed roll connected with the ratchet, in which the tape cutting means includes a rack, a pinion meshing with the rack and a cutter blade operated by the pinion, in which the servo-operated member moves in one direction to move the feeder rack and, concurrently, a spring retracts the blade, in which, while the servo-operated member moves in the opposite direction, a spring backs the feeder pawl along the feeder ratchet and the member moves the rack of the tape cutting means sufficiently to effect tape cutting, and means for disconnecting the member from the last mentioned rack after tape cutting to permit the first mentioned spring to retract the blade.

References Cited in the file of this patent

UNITED STATES PATENTS

| Number | Name | Date |
|---|---|---|
| 1,508,708 | McBride | Sept. 16, 1924 |
| 1,645,865 | Kondakjian | Oct. 28, 1927 |
| 1,694,596 | Kelleher | Dec. 11, 1928 |
| 1,722,240 | Cereghino | July 23, 1929 |
| 1,861,144 | Schmeidel | May 31, 1932 |
| 1,981,946 | Collins | Nov. 27, 1934 |
| 2,101,912 | Meyer | Dec. 14, 1937 |
| 2,130,235 | Heyman | Sept. 13, 1938 |
| 2,223,767 | Lloyd | Dec. 3, 1940 |
| 2,363,866 | Humphner | Nov. 28, 1944 |
| 2,385,103 | Rist | Sept. 18, 1945 |
| 2,445,331 | Moyer | July 20, 1948 |
| 2,471,310 | Charles | May 24, 1949 |
| 2,486,832 | Ferguson | Nov. 1, 1949 |
| 2,509,056 | Gartner | May 23, 1950 |
| 2,528,296 | Baron et al. | Oct. 31, 1950 |
| 2,530,412 | Wallace | Nov. 21, 1950 |
| 2,545,292 | Magnusson | Mar. 13, 1951 |
| 2,569,513 | Burge et al. | Oct. 2, 1951 |

FOREIGN PATENTS

| Number | Country | Date |
|---|---|---|
| 321,427 | Great Britain | Nov. 11, 1929 |